United States Patent [19]

Namba et al.

[11] Patent Number: 4,739,345
[45] Date of Patent: Apr. 19, 1988

[54] OPTICAL RECORDING DISK

[75] Inventors: Kenryo Namba; Shigeru Asami, both of Tokyo; Toshiki Aoi; Kazuo Takahashi, both of Chiba; Noriko Takeda, Tokyo; Mamoru Usami, Chiba; Akihiko Kuroiwa, Kanagawa, all of Japan

[73] Assignee: TDK Corporation, Tokyo, Japan

[21] Appl. No.: 845,636

[22] Filed: Mar. 28, 1986

[30] Foreign Application Priority Data

Apr. 17, 1985 [JP] Japan .................. 60-57200[U]
Jun. 15, 1985 [JP] Japan ................... 60-130435
Jul. 13, 1985 [JP] Japan ................... 60-154912
Mar. 11, 1986 [JP] Japan .................... 61-53206

[51] Int. Cl.$^4$ .................................. G01D 15/24
[52] U.S. Cl. ........................... 346/137; 369/283
[58] Field of Search .............. 346/76 L, 135.1, 137, 346/108; 369/283, 284, 285, 286

[56] References Cited

U.S. PATENT DOCUMENTS 4,449,138  5/1984  Ando ................. 346/76 L X
4,564,932  1/1986  Langé ............... 346/135.1 X

FOREIGN PATENT DOCUMENTS 0086065   8/1983  European Pat. Off. .
0094273  11/1983  European Pat. Off. .
0147083   7/1985  European Pat. Off. .
57-120244  7/1982  Japan .
57-149535  9/1982  Japan .
58-105041  7/1983  Japan .
58-105042  7/1983  Japan .
60-203488 10/1985  Japan .

Primary Examiner—E. A. Goldberg
Assistant Examiner—Mark Reinhart
Attorney, Agent, or Firm—Oblon, Fisher, Spivak, McClelland & Maier

[57] ABSTRACT

An optical recording disk wherein information is written and reproduced through the application of recording and reading laser beams is assembled by preparing a pair of circular substrates which each are provided with a plurality of studs or spikes on outer and/or inner circumferential band, forming a recording layer of dye on each substrate, and joining the substrates together through the studs by ultrasonic sealing or adhesive bonding such that the recording layers face one another via an interior space.

36 Claims, 18 Drawing Sheets

OPTICAL RECORDING DISK

BACKGROUND OF THE INVENTION

This invention relates to an optical recording disk, and more particularly, to an optical recording disk of the heat mode.

The optical recording disks have the feature that they are free of deterioration by abrasion because they are not in contact with writing and reading-out heads. Active research and development works have been focused on a variety of optical recording media.

Among others, optical recording disks of the heat mode have been of most interest because no development procedure in the dark room is necessary. The optical recording disks of the heat mode are optical recording disks utilizing recording light which is converted into heat. One typical example is a pit formation type optical recording disk in which writing is carried out by applying recording light such as a laser beam to the medium to locally melt or remove it to form a small dip called pit where information is recorded, and reading out is carried out by detecting the pit with the use of reading light.

In most pit formation type optical recording disks, particularly those compatible with a light source in the form of semiconductor laser having the benefit of reducing the size of the recording/reproducing system, a recording layer is formed of a tellurium base material. For several reasons including toxicity of tellurium materials, higher sensitivity, and manufacture cost reduction, an increasing number of proposals and reports were recently made for such recording media using organic materials, typically dyes as the recording layer (see Japanese patent application No. 59-19715).

The optical recording media having a recording layer of dyes are preferably designed as a so-called air sandwich structure in order to increase recording quantity. The air sandwich structure is usually produced by preparing a pair of optical recording segments each comprising a transparent substrate of resinous material having a recording layer thereon and joining together the segments such that the recording layers face one another via a predetermined space.

In joining together the optical recording segments to produce a disk of air sandwich structure, ring-shaped connecting members or spacers of resinous material are interposed between the segments along the central and peripheral edges and bonded or fused to the substrates of the segments. Undesirably, such an air sandwich structure is not sufficiently strong because of bonding or fusing of spacers. Cumbersome operations are necessary in that adhesive must be applied to either surface of a spacer, and three parts, two substrates and the spacer must be precisely aligned before the spacer is bonded. During bonding procedure, off-centering of the spacer at the center and offsetting of the substrates are likely to occur. Such misalignment would inconveniently raise a disturbance in dynamic balance during disk rotation. The procedure of fusing spacers is also inefficient.

In the prior art air sandwich structure, the interior space is kept air tight to the exterior. If optical recording disks are held under an ambient pressure different from that for manufacture, for example, during transportation by aircrafts, a pressure difference between the interior space and the ambient would induce strain in the substrates, which would often interfere with recording and reproducing operations.

To obviate these problems, there have been proposed the following techniques.

(a) Either outer or inner spacer is formed with a vent through which the interior space communicates with the ambient atmosphere (see Japanese Utility Model application Kokai No. 57-149535).

(b) A substrate is formed with a vent through which the interior space communicates with the ambient atmosphere (see Japanese Utility Model application Kokai Nos. 58-105041 and 58-105042).

However, technique (a) has the drawback that since the spacer is as thin as about 0.2 to 0.8 mm, perforation of a vent port in the spacer is very difficult and the perforated spacer is mechanically weak. Technique (b) has the drawback that the presence of a vent port obstructs uniform coating in applying a recording layer of dye on a substrate as by spinner coating.

Most commercial optical recording disks generally bear an identification mark having the function of representing a trade mark or product grade. Such identification marks are given by printing marks or attaching labels onto disk substrates. The optical recording disks are under the trend that the area of a recording layer has as large a proportion as possible for increased recording capacity. This, in turn, limits the space available for marking. Further the conventional printing and labeling techniques have additional problems that marks might fade away or be removed and printing would leave stains. A printing or labeling step must be added to the conventional processsing line, requiring an additional installation investment.

The foregoing description is concerned with optical recording disks of the air sandwich structure capable of double-side recording, and the same applies to single-side recording disks of a similar structure in which one segment is merely comprised of a protective substrate.

SUMMARY OF THE INVENTION

It is, therefore, an object of the present invention to provide a novel and improved optical recording disk of the air sandwich structure comprising a pair of substrates defining an interior space therebetween which can be readily assembled with precision to a high mechanical strength, is free of any strain induced in substrates due to a pressure difference between the interior space and the ambient atmosphere, and thus provides good dynamic balance during operation.

It is another object of the present invention to provide such an optical recording disk in which a pair of substrates are assembled to form an air sandwich structure without any influence on coating of a recording layer.

It is a further object of the present invention to provide such an optical recording disk to which an identification mark free of fading or staining or removal can be given.

The present invention is directed to an optical recording disk comprising a pair of disk-shaped substrates each having a central opening and a recording layer formed on at least one of the substrates wherein the substrates are joined at outer and inner circumferential portions to define an interior space therebetween such that the recording layer is enclosed in the space. According to the feature of the present invention, a plurality of stud-like projections are formed on the outer and/or inner circumferential portions of at least one of the substrates whereby the outer and/or inner circumferential portions of the substrates are joined through the projections.

The preferred embodiments are described below.

(1) A plurality of stud-like projections are formed on the outer circumferential portion of at least one of the substrates whereby the outer circumferential portions of the substrates are joined through the projections, and the inner circumferential portions of the substrates are joined through an inner connecting member.

(2) The inner connecting member is an annular member having opposed major plane surfaces to which those surfaces of the inner circumferential portions of the substrates facing the interior space are secured.

(3) The inner connecting member comprises an annular body and ring shaped or ring-like rib formed on a central portion of the circumference of the body whereby the remaining portions of the circumference of the body are in contact with the inner side surfaces of the substrates defining the openings and the axially opposed plane surfaces of the ring-like rib are in contact with the recording layer-bearing surfaces of the substrates adjacent the openings.

(4) The inner connecting member comprises a projection formed on the inner circumferential portion of at least one of the substrates.

(5) The inner connecting member is formed of an adhesive whereby the inner circumferential portions of the substrates are joined to define the interior space between the substrates.

(6) A plurality of stud-like projections are formed on the inner circumferential portion of at least one of the substrates whereby the inner circumferential portions of the substrates are joined through the projections, and the outer circumferential portions of the substrates are joined through an outer connecting member.

(7) The outer connecting member is an annular member having opposed major plane surfaces to which those surfaces of the outer circumferential portions of the substrates facing the interior space are secured.

(8) The outer connecting member comprises a projection formed on the outer circumferential portion of at least one of the substrates.

(9) A plurality of stud-like projections are formed on the outer and inner circumferential portions of at least one of the substrates whereby the outer and inner circumferential portions of the substrates are joined through the projections.

(10) A gap among the projections on the outer circumferential portions is filled with an adhesive to provide an air-tight seal between the interior space and the exterior.

(11) The interior space is in communication with the exterior through gaps among the stud-like projections.

(12) The outer circumferential portions of the substrates are sealed to the outer connecting member to provide an air-tight seal between the interior space and the exterior.

(13) The joint between the outer circumferential portions is provided with a vent through which the interior space communicates with the exterior.

(14) The projections are formed on one of the substrates.

(15) The projections are formed on both the substrates.

(16) Each projection is of non-elongate section shape, such as a cone or pyramid shape.

(17) Each projection includes a base and a sharply configured fusible portion extending from the base whereby the outer and/or inner circumferential portions of the substrates are joined via the fusible portions of the projections.

(18) Each projection is of cylinder or prism shape.

(19) The substrates are bonded through the projections by ultrasonic sealing.

(20) The substrates are bonded through the projections by filling an adhesive among the projections.

(21) The plurality of stud-like projections are distributed on the outer circumferential portions of both the substrates such that the distribution density locally varies, and the outer circumferential portions of the substrates are joined together through the projections by mating a portion of one substrate having the maximum projection distribution with a portion of the other substrate having the minimum projection distribution to thereby provide a substantially uniform distribution of overall projections throughout the joined substrates in a circumferential direction.

(22) The plurality of projections are distributed on the outer and/or inner circumferential portions of at least one of the substrates such that the projections are absent in a certain local region which provides an identification mark.

(23) The projections are formed on a circumferentially extending continuous ridge on the substrate.

(24) The recording layer is formed of a dye alone or a dye composition.

(25) The recording layer is formed on one of the substrates.

(26) The recording layer is formed on each of the substrates.

(27) The substrate having the recording layer formed thereon is substantially transparent to writing and reading light.

(28) The substrates are formed of resin.

(29) The resin is an acrylic resin or polycarbonate resin.

(30) Writing and reading operations are carried out from the rear surface of the substrate remote from the recording layer.

(31) No reflective layer is placed on the recording layer.

DETAILED DESCRIPTION OF THE INVENTION

Referring to FIGS. 1 through 4, there are illustrated optical recording disks according to the present invention. The optical recording disk generally designated at 1 has a pair of optical recording segments 21 and 25. More illustratively, the disk includes a pair of disk-shaped substrates 31 and 35 each having a central opening through which a drive shaft of a recording/reproducing apparatus (not shown) extends. Recording layers 41 and 45 are provided on the substrates 31 and 35, respectively, in the form of a concentric band.

The substrates 31, 35 are of disk shape having a central opening and formed of a resinous material substantially transparent to writing and reading light, preferably having a transmittance of at least 80%. Writing and reading operations may then be carried out from the rear surface of the substrate remote from the recording layer. The resinous materials of which the substrates are formed may be any suitable plastic materials such as acrylic resins, polycarbonate resins, nylon, and PTX. The currently preferred substrates have an outer diameter of about 70 mm to about 310 mm. The substrates are generally formed by molding and stamping.

Figure 1:
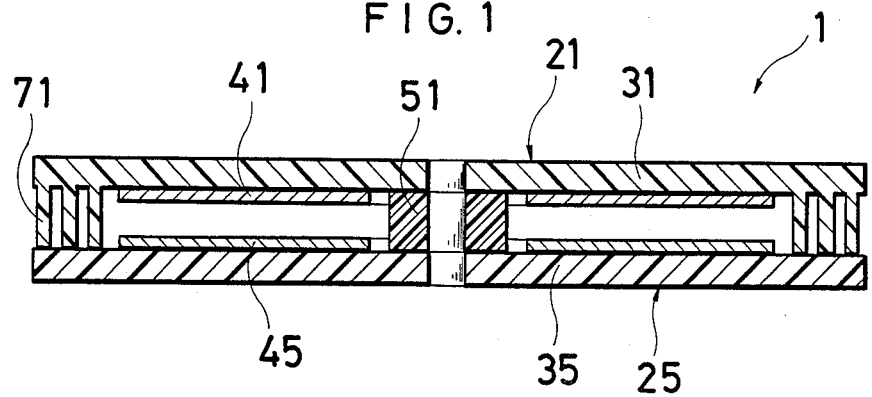
FIGS. 1, 2, 3, and 4 are cross-sectional views of optical recording disks according to different embodiments of the present invention.
Figure 2:
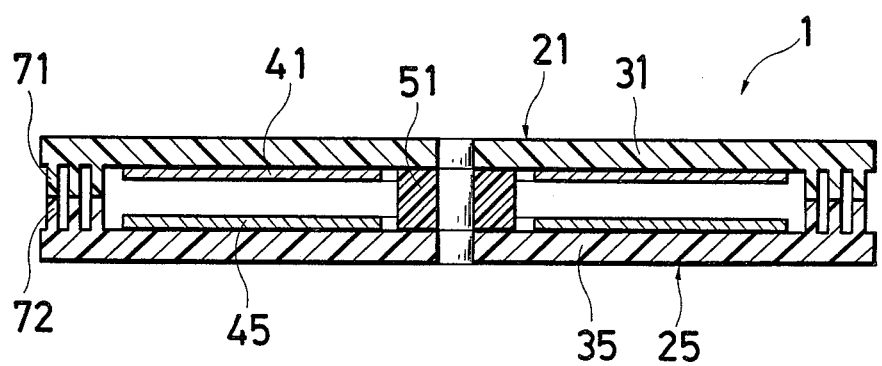
Figure 3:
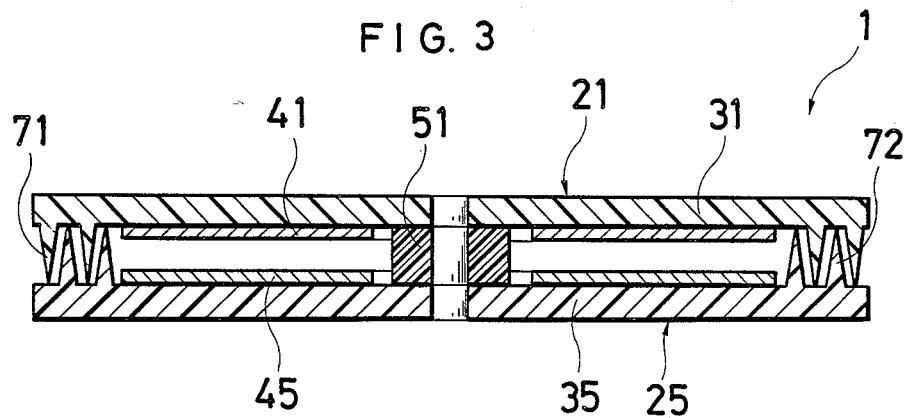
Figure 4:
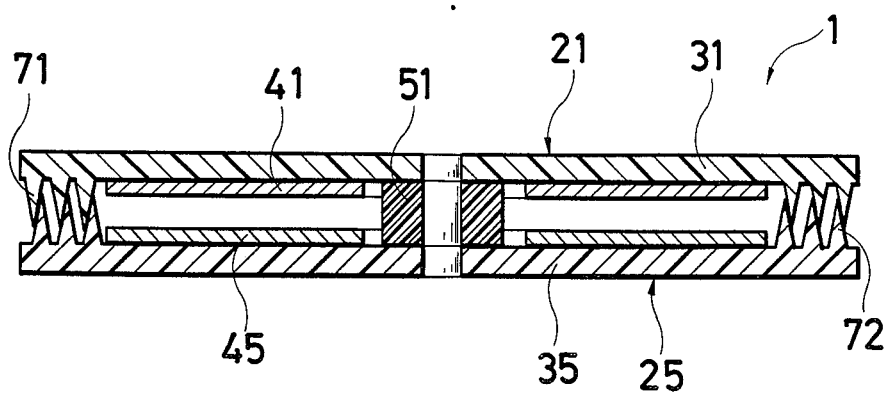
Figure 5:
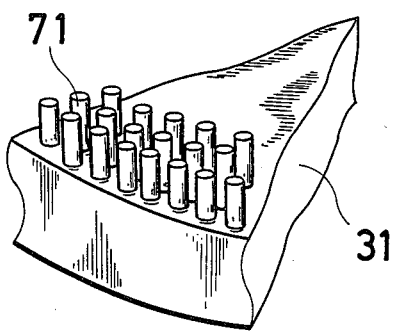
FIGS. 5 and 6 are enlarged perspective views of a portion of the substrate used in the disk of the present invention, showing different examples of stud-like projections.
Figure 6:
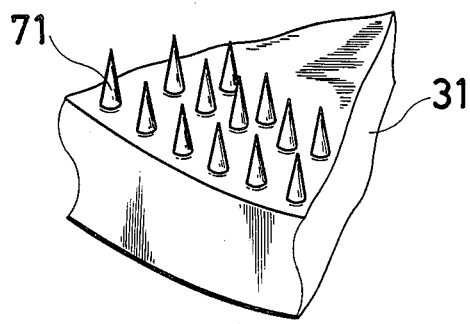

One or both of the substrates 31, 35 are provided with a plurality of stud-like projections 71, 72 on their outer circumferential portions as shown in FIGS. 1 through 9. The stud-like projections 71, 72 extend substantially perpendicular to the surface of the substrates 31, 35 on which the recording layers are to be formed. The stud-like projections 71, 72 which can be used in the practice of the present invention may be of cylindrical shape as shown in FIG. 5 or of conical shape as shown in FIG. 6 although the configuration of the projections is not particularly limited. They may also be of prism shapes such as triangular and rectangular prisms and of pyramid shapes such as triangular and rectangular pyramids. The projections need not be limited to one particular configuration and they may be a mixture of different shapes, for example, a regularly or randomly distributed mixture of triangular prism, rectangular prism, and triangular pyramid shapes. The stud-like projections 71, 72 may have a diameter of about 0.2 to about 6 mm. The studs can form radially spaced interdigitated rows, as shown in FIGS. 3 and 4.

Figure 7:
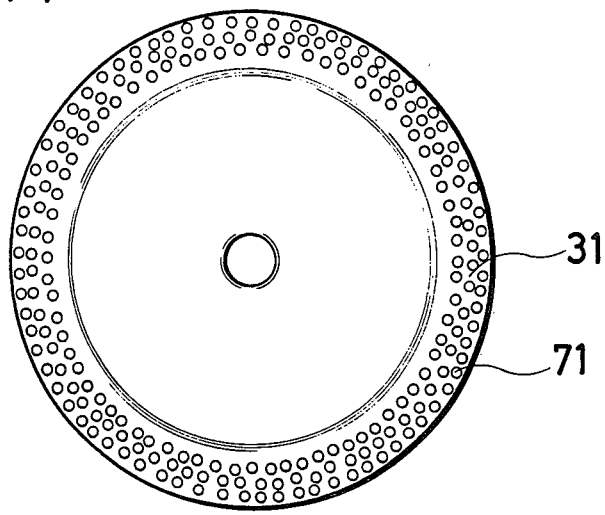
FIGS. 7, 8, and 9 are plan views of different examples of the substrate used in the disk of the present invention.
Figure 8:
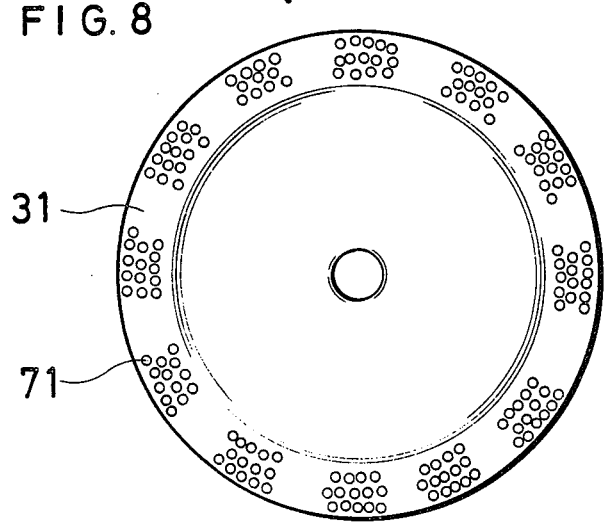
Figure 9:
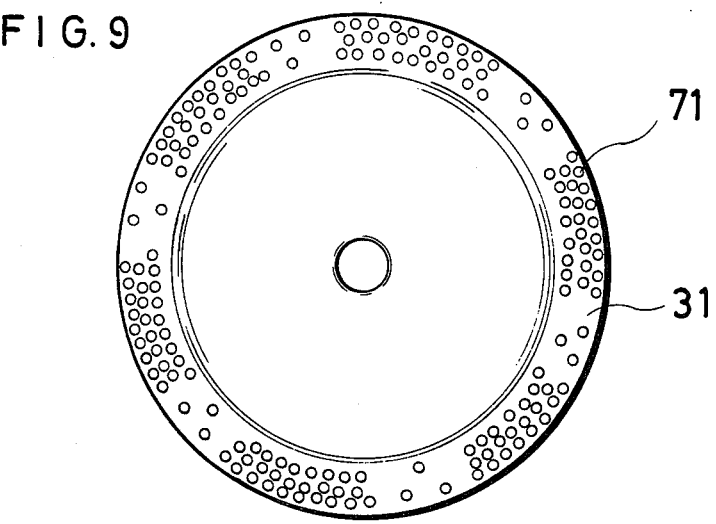

The plurality of stud-like projections 71, 72 may be distributed on the outer and inner circumferential portions of the substrates 31, 35 in a variety of patterns. Examples of the distribution pattern are shown in FIGS. 7 to 9. As shown in FIG. 7, the projections 71 may be distributed substantially uniformly throughout the outer circumferential band of the substrate 31. As shown in FIG. 8, groups of the projections 71 may be distributed locally, preferably at intervals along the outer circumferential band of the substrate 31. The distribution pattern shown in FIG. 8 includes regularly spaced empty zones, that is, zones where no projections are present. The projections 71 may also be distributed to be locally dense and sparse as shown in FIG. 9. In either case, they are preferably distributed in a symmetrical fashion over the substrate.

Irrespective of whether the projections 71 are uniformly or locally distributed on the substrate, they may preferably be located in the range having a radial distance of about 2 to about 8 mm on the outer circumferential band.

The substrates 31, 35 having such projections formed thereon are joined together into a one-piece disk. A variety of joint forms are possible depending of the particular type of projection. In the embodiment shown in FIG. 1, the projections 71 having a height substantially equal to the distance of the interior space to be defined between the substrates are formed on one substrate 31. This projection-formed substrate 31 is joined to the other substrate 35 having no projections. The distribution of projections may be any one of the patterns shown in FIGS. 7 to 9.

In another embodiment as shown in FIG. 2, the projections 71, 72 having a height substantially equal to half the distance of the interior space to be defined between the substrates are respectively formed on substrates 31, 35 in a mirror image relationship. The substrates are joined together by mating their projections 71, 72 in abutment followed by bonding or fusing. The distribution of projections may be any one of the patterns shown in FIGS. 7 to 9.

A further embodiment is shown in FIG. 3 wherein a pair of substrates 31, 35 having continuously distributed projections as shown in FIGS. 7 to 9 are joined by interdigitating their projections 71, 72 while leaving gaps therebetween. Alternatively, a pair of substrates having projections distributed in regular intervals as shown in FIG. 8 may be joined by mating the projection zones with the empty zones such that the projections 71, 72 on the opposite sides may not be abutted or interdigitated.

A further embodiment is shown in FIG. 4 wherein a pair of substrates 31, 35 having continuously distributed projections as shown in FIGS. 7 to 9 are joined by interdigitating their projections 71, 72 in close engagement and bonding them together at the contacts.

In all these embodiments, joining of the substrates through the projections 71 and/or 72 may be accomplished by any desired techniques. Ultrasonic sealing is preferred among others because stud-like projections 71, 72 are effectively heated and thus efficiently sealed with ease of operation. The resulting bond strength is fully high and the interior space may be precisely defined to the controlled distance. During ultrasonic sealing, the stud-like projections 71, 72 usually undergo deformation of various types. If the projections are densely distributed and greatly deformed during ultrasonic sealing, an air tight barrier would be formed throughout the outer circumference.

The joint between the substrates may be provided with a vent. The vent is imparted by gaps between projections in the embodiment of FIG. 7 or formed in the empty or sparse zones in the embodiments of FIGS. 8 and 9.

Joining of the substrates through projections may also be achieved by adhesive bonding. In applying adhesive, it is introduced into gaps among the projections and then evenly distributed over the gaps by the capillary action without oozing out of the edge, giving an aesthetic finish. There is no danger of causing damage to the recording layer. A satisfactory mechanical strength is obtained. An air tight barrier may be formed throughout the outer circumference by applying the adhesive over the entire circumference. Alternatively, the adhesive may be introduced into only selected portions to leave unbonded portions which serve as vents. In this case, only the selected portions can be precisely bonded to add to an advantage in manufacturing process.

To insure strength, each substrate may preferably be provided with about 100 to about 2,000 projections.

When vents are given by gaps among projections, their total area may preferably range from about 0.01 to about 100 mm$^2$.

Since the substrates are joined through a plurality of stud or spike-like projections such that the interior space communicates with the ambient atmosphere through gaps among the projections, the induction of strain in the substrates due to pressure difference is avoided.

A filter may be disposed adjacent the projections 71, 72 to prevent entry of dust and dirt.

The stud-like projections may be formed integral with substrates simply by modifying a mold or a stamper or platen for substrate forming.

The substrates 31, 35 are joined together through the stud-like projections and an inner connecting member such that the recording layer may be enclosed in the interior space. Preferably, a pair of recording layers may face one another.

The inner connecting member used herein may be of any desired shape. It is generally an annular or ring-shaped member 51 formed of resinous material as shown in FIGS. 1 to 4. The annular member 51 has opposed major plane surfaces to which those surfaces of the inner circumferential portions of the substrates 31, 35 facing the interior space are secured by bonding or fusing. The annular member 51 has a bore which is aligned with the central openings in the substrates.

Figure 10:
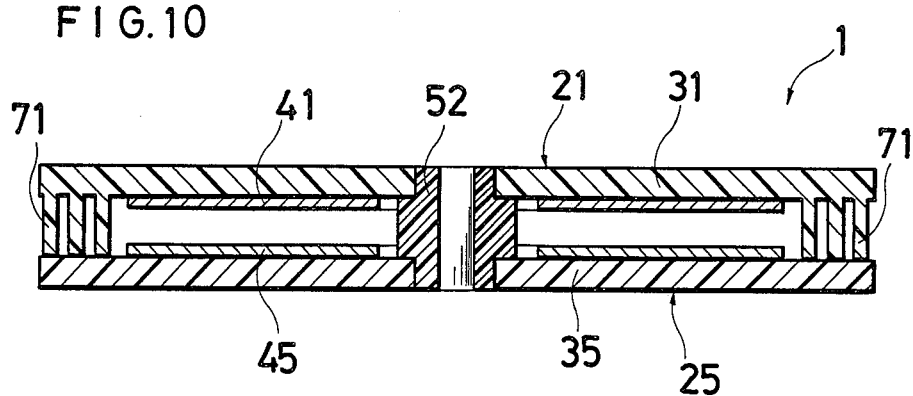
FIGS. 10, 11, 12, 13, 14, 15, 21, 24, and 25 are cross-sectional views of optical recording disks according to different embodiments of the present invention.
Figure 11:
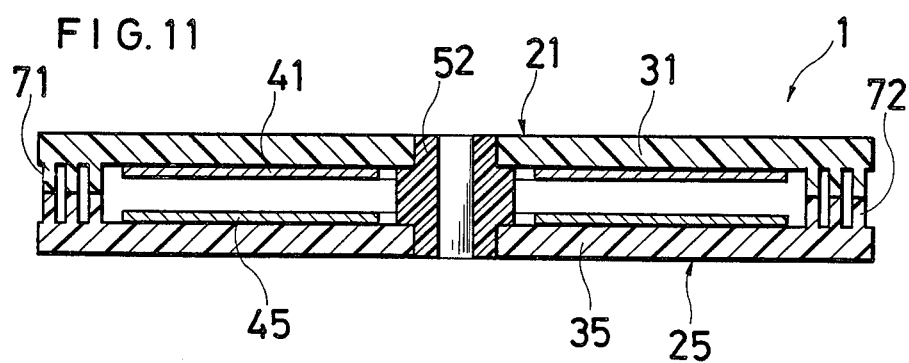
Figure 12:
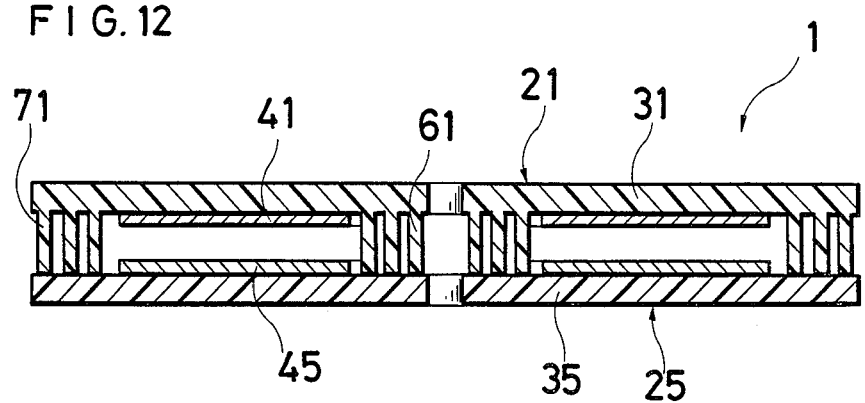

The optical recording disk of the present invention may be produced as shown in FIGS. 10 and 11 by joining a pair of substrates 31, 35 each having a central opening and a recording layer through an inner connecting member 52 such that the recording layers 41, 45 face one another. The inner connecting member shown in FIGS. 10 and 11 is a stepped connecting member 52 comprising an annular body and a ring-like rib formed on an axially central portion of the circumferece of the body. The remaining portions of the circumference of the body are in contact with the inner side surfaces of the substrates 31, 35 defining the openings. The axially opposed plane surfaces of the ring-like rib are in contact with the recording layer-bearing surfaces of the substrates 31, 35 adjacent the openings. These contact surfaces may be tapered if desired. The substrates 31, 35 are secured to the inner connecting member 52 along the contact surfaces by bonding or fusing. The annular body has a bore into which a drive shaft may be inserted as previously described. The rib is generally ring-like, but may be partially cut out if desired.

The inner connecting member 52 preferably has the following dimensions. The diameter of the body which is equal to that of the central opening in the substrates 31, 35 ranges from about 15 to 38 mm, the diameter of the rib ranges from about 20 to 50 mm, the diameter of the bore in the body ranges from about 15 to 35 mm, the axial distance of the body ranges from about 2.8 to 3.4 mm, and the axial thickness of the rib ranges from about 0.2 to 0.8 mm. These dimensions may be properly determined by various considerations. Particularly, the axial thickness of the rib determines the distance of the interior space between the substrates. The distance of the interior space generally ranges from about 0.1 to about 1 mm, preferably from about 0.2 to about 0.8 mm.

The inner connecting member 52 is formed from a variety of materials and usually from resinous materials as is the aforementioned inner connecting member 51. The inner connecting member 52 may be prepared by a variety of techniques including molding and machining. Since the inner connecting member 52 is fitted in the openings in the substrates, high precision forming is desired for proper engagement.

Instead of using the inner connecting members 51 and 52, a pair of substrates may also be joined by providing one substrate with a ridge and the other substrate with a ridge and a recess both along the inner circumferential band.

Furthermore, instead of using a solid inner connecting member, an adhesive may be used as an equivalent inner connecting member. The substrates are joined along the inner circumference with the adhesive so as to leave a predetermined interior space therebetween.

The adhesives used herein include a variety of well-known adhesives such as hot-melt resins. When such an adhesive as a hot-melt resin is used, for example, the substrates may be simultaneously joined along the outer circumference via projections by ultrasonic sealing and along the inner circumference by adhesive bonding.

The surfaces of the substrates 31, 35 where the recording layers 41, 45 are to be formed are preferably preformed with tracking grooves. The grooves generally have a depth of about $\lambda/8n$, preferably $\lambda/7n$ to $\lambda/12n$ wherein n is the refractive index of the substrate and $\lambda$ is the wavelength of a writing/reading laser beam. The grooves may have a width approximate to the track width.

Those portions of the recording layers 41, 45 in the grooves form recording tracks to which writing and reading light is applied from the rear surface of the substrates. This arrangement results in improved writing sensitivity and reading S/N ratio while a more definite control signal is available for tracking.

An additional series of preferred embodiments of the present invention are illustrated in FIGS. 12, 13, 14, 15, 21, 24, and 25 as comprising a pair of substrates 31, 35 having a plurality of stud-like projections 61, 62 on the inner circumferential band around the central aperture. It will be understood that FIGS. 12 to 20 substantially correspond to FIGS. 1 to 9.

In the embodiments shown in FIGS. 12 to 20, a plurality of stud-like projections 61, 62 are formed on the inner circumferential band around the central aperture in addition to a plurality of stud-like projections 71, 72 on the outer circumferential band. A pair of substrates 31 and 35 are joined together along the outer and inner circumferential bands both through the projections 71, 72 and 61, 62.

Figure 16:
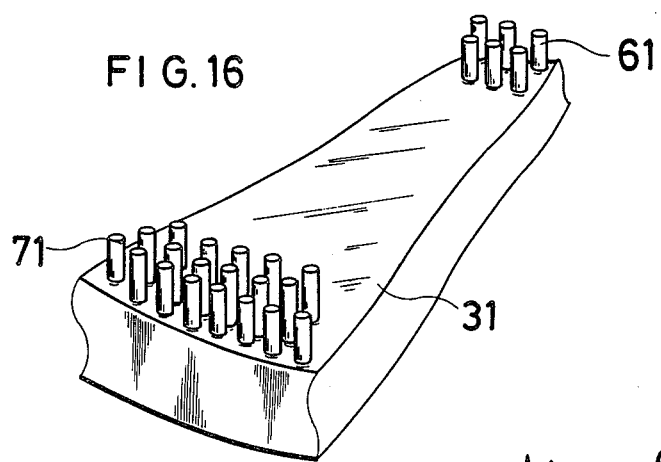
FIGS. 16, 17, 23, and 27 are enlarged perspective views of a portion of the substrate used in the disk of the present invention, showing different examples of stud-like projections.
Figure 17:
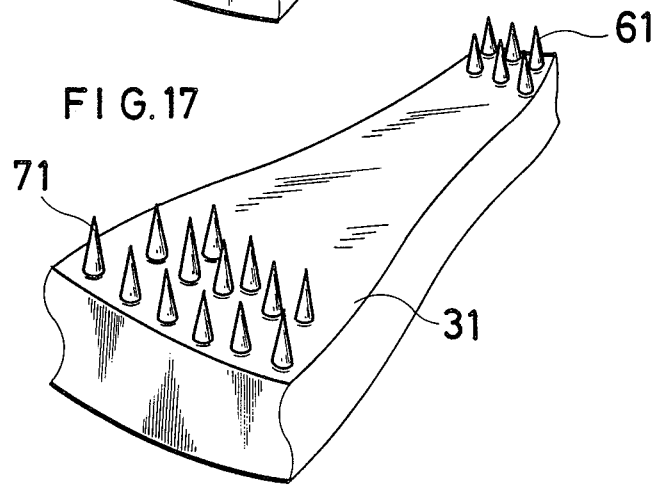

The stud-like projections 61, 62 extend substantially perpendicular to the surface of the substrates 31, 35 on which the recording layers 21, 25 are to be formed. The stud-like projections 61, 62 which can be used in the practice of the present invention are similar to the projections 71, 72 in the preceding embodiments and may be of cylindrical shape as shown in FIG. 16 or of conical shape as shown in FIG. 17 although the configuration of the projections is not particularly limited. They may also be of prism shapes such as triangular and rectangular prisms and of pyramid shapes such as triangular and rectangular pyramids. The projections need not be limited to one particular configuration and they may be a mixture of different shapes, for example, a regularly or randomly distributed mixture of triangular prism, rectangular prism, and triangular pyramid shapes. The stud-like projections 61, 62 may have a diameter of about 0.2 to about 6 mm.

Figure 18:
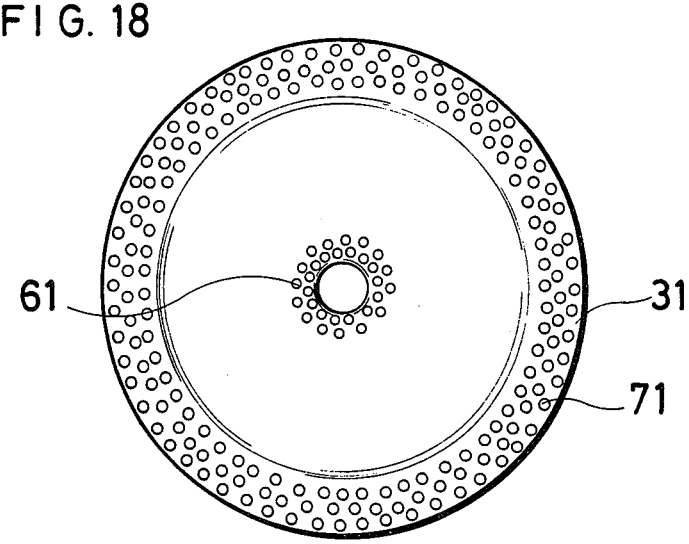
FIGS. 18, 19, 20, 22, and 26 are plan views of different examples of the substrate used in the disk of the present invenion.
Figure 19:
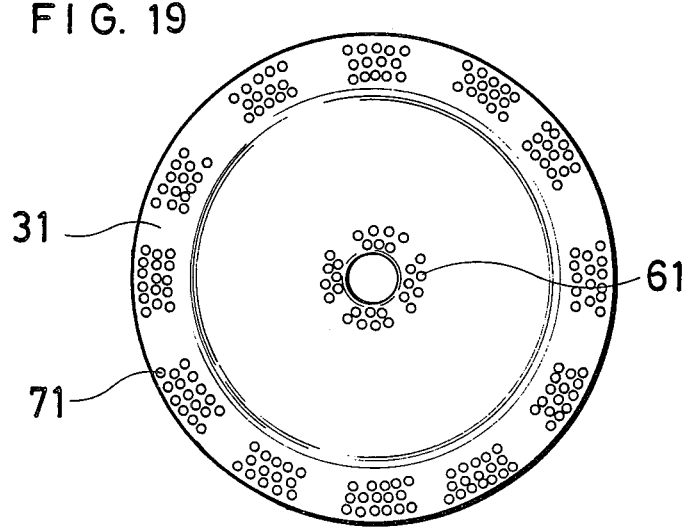
Figure 20:
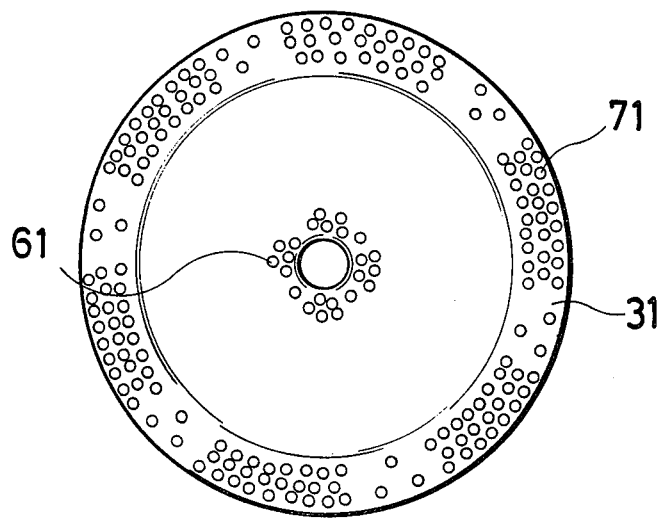

The plurality of stud-like projections 61, 62 may be distributed on the outer and inner circumferential portions of the substrates 31, 35 in a variety of patterns. Examples of the distribution pattern are shown in FIGS. 18 to 20. As shown in FIG. 18, the projections 61 may be distributed substantially uniformly throughout the outer circumferential band of the substrate 31. As shown in FIG. 19, groups of the projections 61 may be distributed locally, preferably at intervals along the outer circumferential band of the substrate 31. The distribution pattern shown in FIG. 19 includes regularly spaced empty zones, that is, zones where no projections are present. The projections 61 may also be distributed to be locally dense and sparse as shown in FIG. 20. In either case, they are preferably distributed in a symmetrical fashion over the substrate.

Irrespective of whether the projections 61 are uniformly or locally distributed on the substrate, they may preferably be located in the range having a radial distance of about 2 to about 8 mm on the outer circumferential band.

The substrates 31, 35 having such projections formed thereon are joined together into a one-piece disk. A variety of joint forms are possible depending of the particular type of projection. In the embodiment shown in FIG. 12, the projections 61 having a height substantially equal to the distance of the interior space to be defined between the substrates are formed on one substrate 31. This projection-formed substrate 31 is joined to the other substrate 35 having no projections. The distribution of projections may be any one of the patterns shown in FIGS. 18 to 20.

Figure 13:
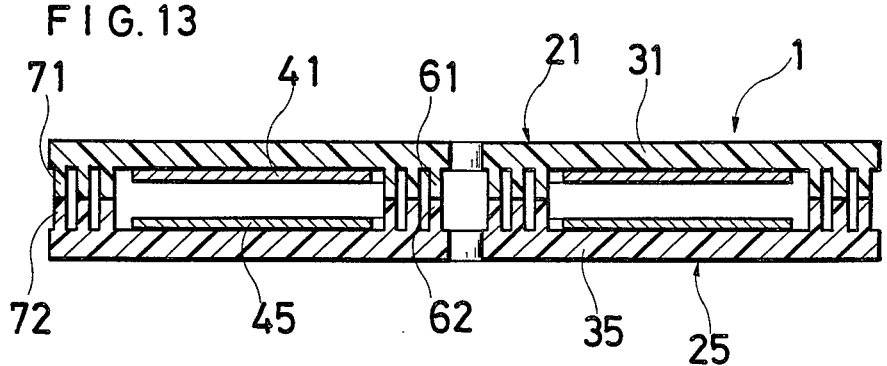

In another embodiment as shown in FIG. 13, the projections 61, 62 having a height substantially equal to half the distance of the interior space to be defined between the substrates are respectively formed on substrates 31, 35 in a mirror image relationship. The substrates are joined together by mating their projections 61, 62 in abutment followed by bonding or fusing. The distribution of projections may be any one of the patterns shown in FIGS. 18 to 20.

Figure 14:
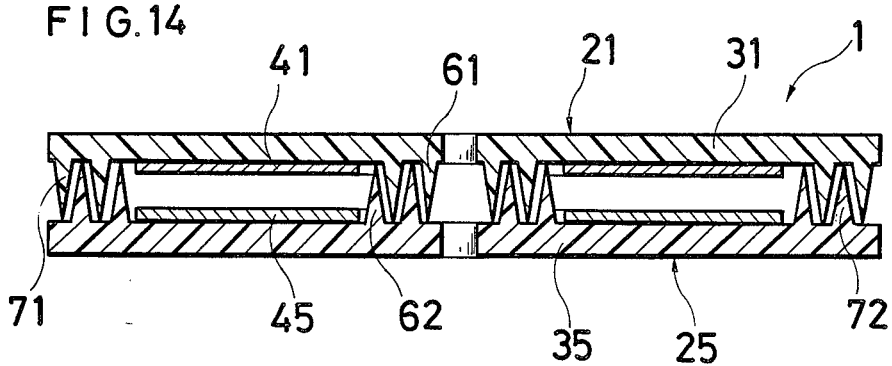

A further embodiment is shown in FIG. 14 wherein a pair of substrates 31, 35 having continuously distributed projections as shown in FIG. 18 are joined by interdigitating their projections 61, 62 while leaving gaps therebetween. Alternatively, a pair of substrates having projections distributed in regular intervals as shown in FIGS. 19 and 20 may be joined by mating the projection zones with the empty zones such that the projections 61, 62 on the opposite sides may not be abutted or interdigitated.

Figure 15:
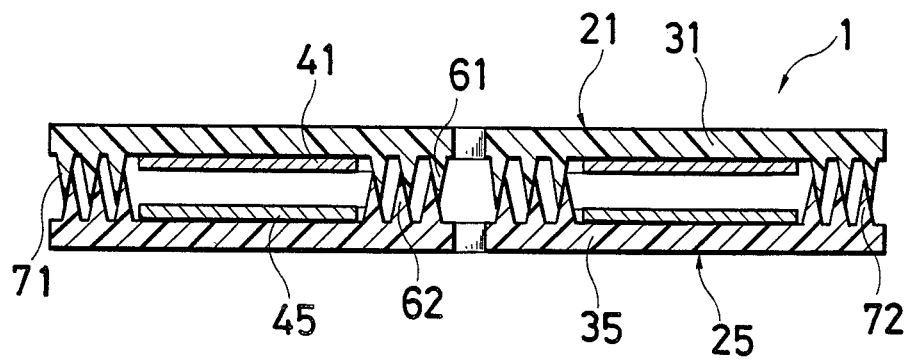

A further embodiment is shown in FIG. 15 wherein a pair of substrates 31, 35 having continuously distributed projections as shown in FIGS. 18 to 20 are joined by interdigitating their projections 61, 62 in close engagement and bonding them together at the contacts.

In all these embodiments, joining of the substrates through the projections 61 and/or 62 may be accomplished by any desired techniques. Ultrasonic sealing is preferred among others because stud-like projections 61, 62 are effectively heated and thus efficiently sealed with ease of operation. The resulting bond strength is fully high and the interior space may be precisely defined to the controlled distance. During ultrasonic sealing, the stud-like projections 61, 62 usually undergo deformation of various types. If the projections are distributed dense and greatly deformed during ultrasonic sealing, an air tight barrier would be formed throughout the outer circumference.

Joining of the substrates through projections may also be achieved by adhesive bonding. In applying adhesive, it is introduced into gaps among the projections and then evenly distributed over the gaps by the capillary action without oozing out of the edge, giving an aesthetic finish. There is no danger of causing damage to the recording layer. A satisfactory mechanical strength is obtained. An air tight barrier may be formed throughout the outer circumference by applying the adhesive over the entire circumference.

To insure strength, each substrate may preferably be provided with about 500 to about 3,500 projections on the inner circumferential band.

The stud-like projections may be formed integral with substrates simply by modifying a mold or a stamper or platen for substrate forming.

In these embodiments, a pair of substrates 31 and 35 are joined together along the inner circumferential band through the projections 61, 62 and along the outer circumferential band through an outer connecting member 55.

The joining of the substrates along the outer circumference may be accomplished by a variety of methods. In the embodiments shown in FIGS. 12 to 20, the substrates are joined together via a plurality of stud-like projections 71, 72 on the outer circumferential band. The same discussion as made for the projections 71, 72 in the embodiments shown in FIGS. 1 to 11 applies to the projections 71, 72 on the outer circumferential band in these embodiments shown in FIGS. 12 to 20 with respect to shape, size, forming, distribution, engagement, function, and other considerations.

Figure 21:
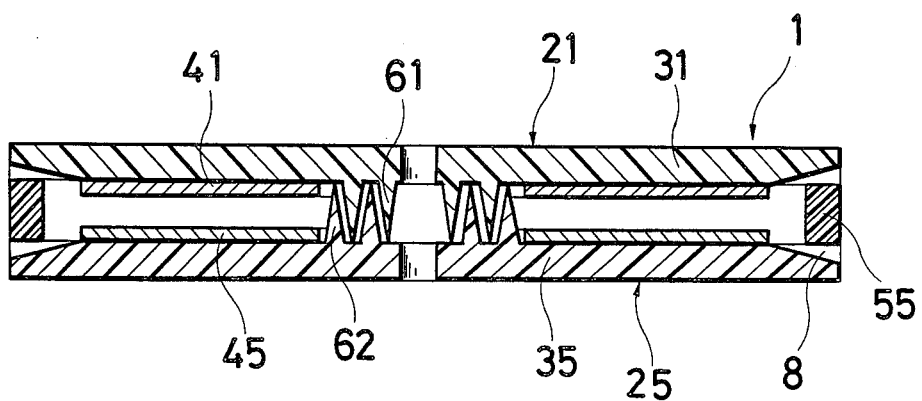
Figure 22:
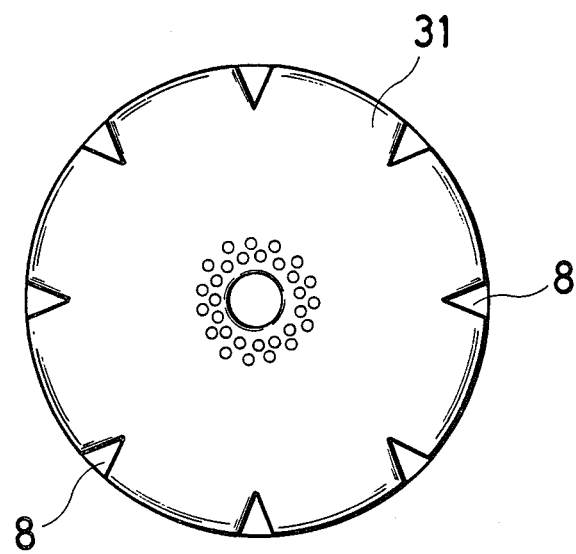
Figure 23:
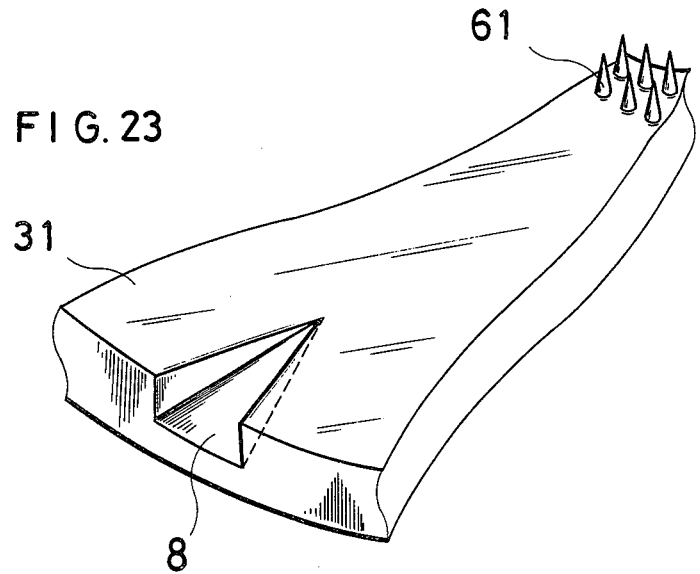

More particularly, each of the substrates 31, 35 is provided with a plurality of recesses 8 as shown in FIGS. 21 to 23. In the illustrated examples, the recess 8 is of a sector shape having a slant bottom. The recess 8 is dimensioned to a radius of about 0.3 to about 1.0 cm and required to be longer than the radial distance of the connecting member 55. The sector shape of the recess has an included angle of about 5° to about 60°. The depth of the recess 8 is about ½ to about 1/10 of the thickness of the substrate for strength consideration.

The recesses 8 are not particularly limited to the abovementioned with respect to shape and dimensions and may be of suitable shape and size as long as controlled entry of dust and dirt into the interior space is taken into account.

The provision of recesses in the substrates is not necessarily needed although such recesses are advantageous in that the interior space communicates with the ambient therethrough to avoid the occurrence of strain in the substrates due to pressure difference. A filter may be disposed adjacent the recesses 8 to prevent entry of dust and dirt. The recesses 8 may be formed in one of the substrates or preferably in both the substrates in a symmetrical fashion.

The recesses may be formed by any desired techniques, for example, formed at the same time as molding of substrates or subsequently processed in substrates by stamping or machining.

The substrates 31, 35 are joined together through the outer connecting member 55 and stud-like projections 61, 62 on the inner circumferential band such that the recording layers 41, 45 face one another. The shape of the stud-like projections 61, 62 may be any desired one as shown in FIGS. 12 to 15.

The outer connecting member is a ring 55 having an outer diameter equal to that of the substrates as shown in FIG. 21. When a pair of substrates 31, 35 are joined through the ring 55, the recesses 8 provide communication between the interior space and the ambient atmosphere.

The outer connecting member 55 may be of any shape other than the ring shown in FIG. 21 and formed of any desired materials, preferably resinous materials as in the case of inner connecting members 51 and 52. The outer connecting member 55 is secured to the substrates 31, 35 by adhesive bonding or fusing.

Figure 24:
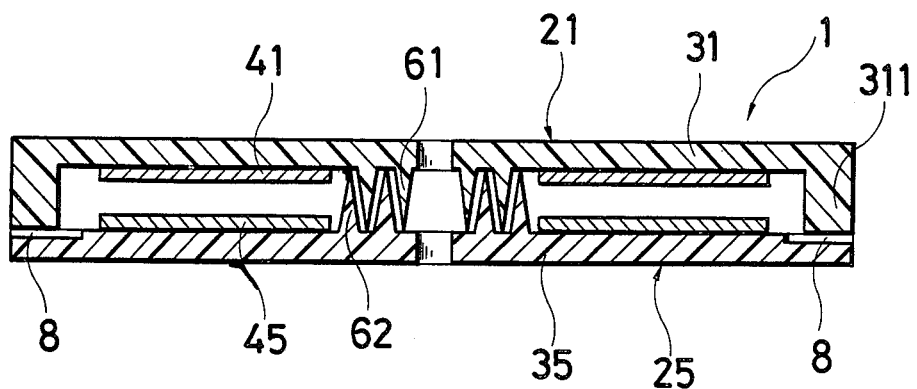
Figure 25:
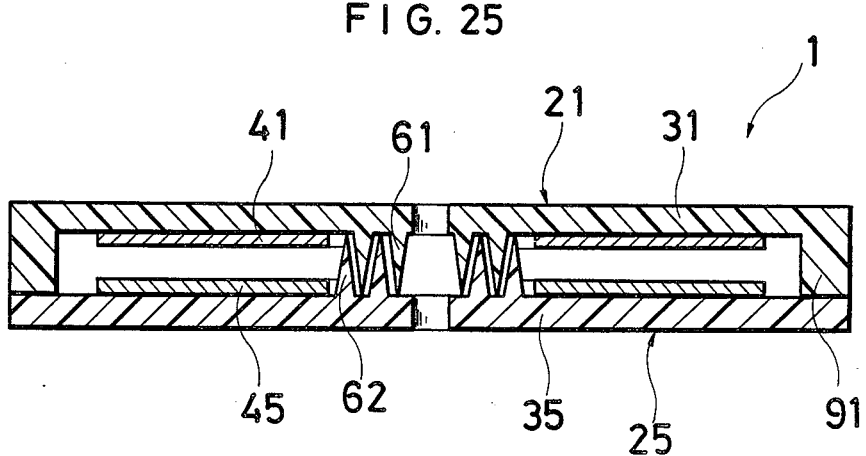

FIG. 24 illustrates another connection between the substrates at the outer circumference. One substrate 31 is provided with a ring-shaped rim 311 along the outer circumference. The rim 311 has a rectangular cross section in the illustrated embodiment, but is not limited to a particular shape. A suitable shape may be chosen in accordance with other considerations. When ultrasonic sealing is applied, for example, a portion of the rim to be fused may be of an edge shape, for example, a triangular tip such that ultrasonic sealing energy may concentrate there.

The rim generally has the same cross section at any circumferential positions, but if desired, may have different cross sections at predetermined positions. The ring-like rim 311 is preferably formed over a radial distance of about 2 to 8 mm on the outer circumferential band.

The other substrate 35 is provided with a plurality of recesses 8 as in the embodiments shown in FIGS. 21 to 23. The provision of recesses in the substrates is not necessarily needed although such recesses are advantageous in that the interior space communicates with the ambient therethrough to avoid the occurrence of strain in the substrates due to pressure difference. The recess 8 is dimensioned to a radius of about 0.3 to about 1.0 cm and required to be longer than the radial distance of the rim 311. The width and depth of the recesses 8 may be equal to those mentioned above.

A pair of substrates 31, 35 are joined together through the ring-like rim 311 and numerous stud-like projections 61, 62 on the inner circumferential band such that the recording layers 41, 45 face one another.

The projections 61, 62 may have any desired one of the shapes shown in FIGS. 12 to 15. Then the interior space communicates with the ambient atmosphere through the recesses 8 when a pair of substrates 31, 35 are assembled.

FIGS. 25 to 28 illustrate a still further embodiment of connection of substrates along the outer circumference.

Figure 26:
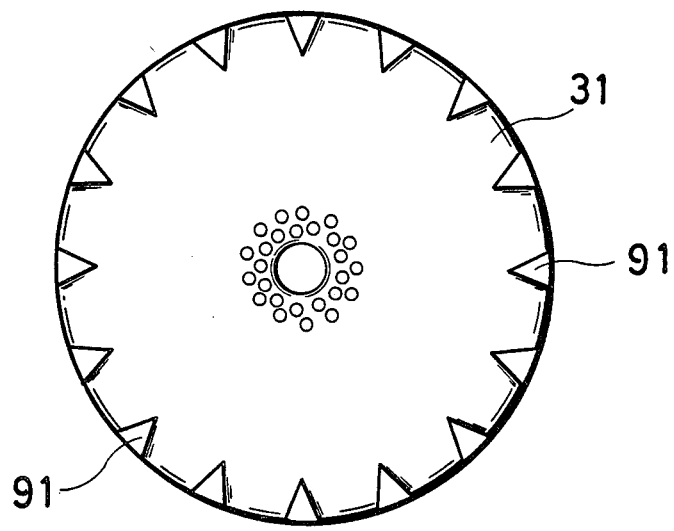
Figure 27:
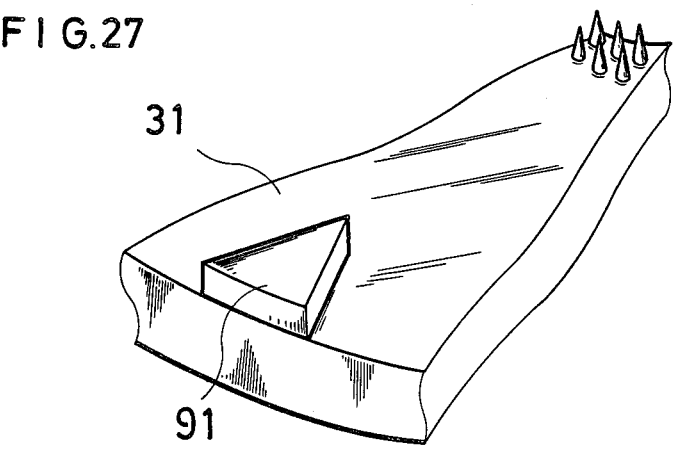

At least one of the substrates 31, 35 is provided on the outer circumferential band with a plurality of projections 91 integral with the substrate. In the illustrated embodiment, the projection has a sector shape having a flat top surface with its center located inside the substrate periphery as best shown in FIGS. 26 and 27. No particular limit is imposed on the shape of the projections 91. They may be of cylindrical or rectangular prism shape while the top surface may be convex.

Instead of the spaced-apart projections 91 as illustrated, the projections may also be formed continuous in the form of a ring. Such a continuous ring may be partially formed with one or more cut-outs.

However, preferred is the illustrated embodiment wherein a plurality of projections 91 are formed integral with the substrate into a sector shape with its center directed toward the disk center. Then, dyes or other active materials can be spinner coated to form recording layers 41, 45 without any contamination of the recording region due to excessive deposits or splashes of the coating composition around the projections. The sector shape of projections 91 preferably has an included angle of about 5° to about 90°.

At least one of the substrates is provided with a plurality of projections 91 formed integral with the substrate. The projections may be formed on only one substrate. In this case, the number and size of vents are determined by the number, spacing, and height of projections 91 on the substrate.

Figure 28:
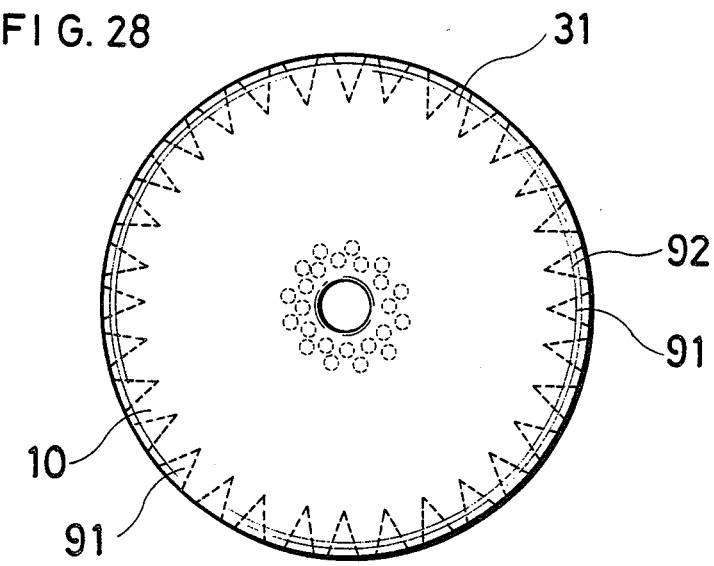
FIG. 28 is a plan view of the optical recording disk according to a further embodiment of the present invention.

The projections may be formed on both the substrates. In this case, projections 91, 92 are formed on the substrates in a mirror image relationship. Then the projections 91 and 92 may be secured to one another. Alternatively, the substrates may be joined such that the projections 91 and 92 are alternately positioned as shown in FIG. 28. There are then left gaps between adjoining projections 91 and 92 which serve as vents 10. Preferably, 2 to about 8 vents are provided in the disk, particularly symmetrically throughout the disk. The vents are dimensioned to have a height (which is generally equal to the gap distance) of about 0.1 to about 0.8 mm and a width of about 0.1 to about 10 mm.

When both the substrates 31 and 35 are provided with the projections 91 and 92, a ring-like spacer (not shown) may sometimes be interposed between the projections 91 and 92.

The provision of the substrates with the projections 91, 92 to form vents 10 through which the interior space communicates with the ambient atmosphere is effective in preventing the induction of strain in the substrates due to pressure difference.

A filter may be loacted inside the gaps or vents 10 given by the projections to prevent entry of dust and dirt.

The projections may be formed simultaneous with molding or stamping of substrates simply by previously modifying the mold or stamper or platen used.

The substrates 31, 35 are joined together through the projections 91, 92 on the outer circumferential band and the stud-like projections 61, 62 on the inner circumferential band such that the recording layers 41, 45 may face one another. As in the preceding embodiments, the stud-like projections 61, 62 may take any of the shapes shown in FIGS. 1 to 4.

The surface of the substrates 31, 35 on which the recording layers 41, 45 are to be formed is preferably formed with tracking grooves as previously mentioned.

In a further preferred embodiment of the invention, the stud-like projections may be located in the outer circumferential band of the substrates 31, 35 in a varying distribution pattern.

Figure 29:
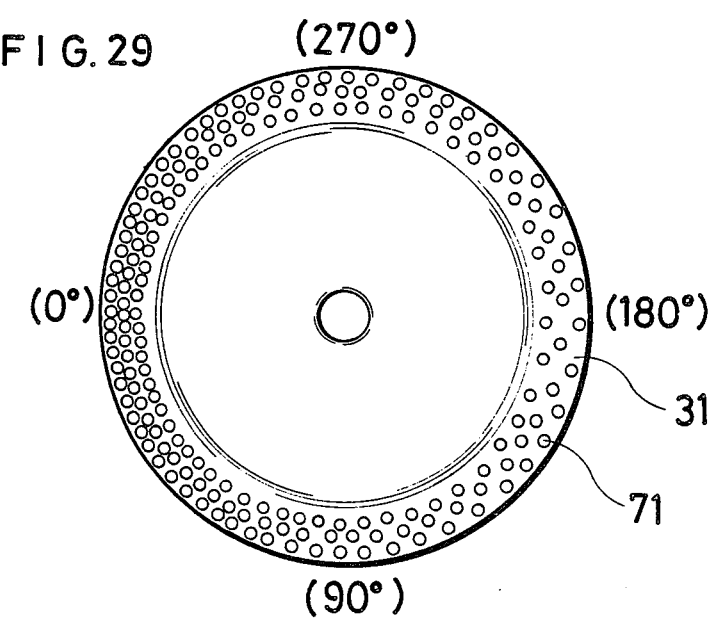
FIG. 29 is a plan view of a further example of the substrate used in the optical recording disk of the present invention.

One exemplary pattern of varying distribution of projections is shown in FIG. 29. A certain region along the outer circumferential band of the substrate 31, which is identified as position 0° for convenience of description, is a region where projections 71 are distributed in the highest density or population (to be referred to as the most dense region having a projection density dmax). That region located along the outer circumferential band of the substrate 31 and diagonal to the most dense region, that is, position 180° is a region where projections 71 are distributed in the lowest density or population (to be referred to as the most sparse region having a projection density dmin). The number of projections per unit area is gradually reduced along the substrate outer circumference from the most dense region to the most sparse region.

In the practice of the present invention, a pair of substrates 31, 35 having the same distribution of stud-like projections 71, 72 are used. The substrates are joined by mating the projections 71, 72 in abutment while the most dense region of one substrate 31 overlaps the most sparse region of the other substrate 35. There is obtained the joined substrates in which the projections are distributed in a substantially uniform density equal to (dmax+dmin).

In the projection distribution pattern shown in FIG. 29, the projections are distributed on each of the substrates 31, 35 in regions intermediate the most dense and sparse regions, that is, at positions 90° and 270° in a density equal to an average of the maximum and minimum densities, (dmax+dmin)/2. The projection distribution between the most dense and sparse regions is such that the projections are formed in a progressively increasing density toward the most dense region and in a progressively decreasing density toward the most sparse region both from the intermediate regions, positions 90° and 270°. In addition, the projections 71, 72 are distributed such that the sum of projection densities at points oppositely spaced an equal angle from the intermediate regions or positions 90° and 270° toward the most dense and sparse regions is equal to (dmax+dmin).

The projection distribution pattern is not limited to the above-illustrated one and a variety of patterns will occur to those skilled in the art. Preferably, the density of projections 71, 72 is linearly varied from the most dense region to the most sparse region.

When projections are distributed in the above-mentioned pattern, a pair of substrates having the same projection distribution pattern are joined together such that the most dense region of one substrate mates with the most sparse region of the other. Then the resulting assembly has a substantially uniform projection density equal to (dmax+dmin) along the outer circumference.

This procedure allows a pair of substrates to be quickly assembled and bonded into a well-balanced assembly with improved productivity because it is only required to mate the most dense region with the most sparse region before bonding. Also the use of the same parts contributes to a reduction of manufacturing cost.

No particular limit is imposed on the number of the most dense and sparse regions present on the substrates 31, 35. Although one dense region and one sparse region are present in the illustrated embodiment, two dense regions and two sparse regions may also be present on each substrate. In the latter case, the most dense regions are present at positions 0° and 180° and the most sparse regions are present at positions 90° and 270°. A pair of the same substrates 31, 35 each having two sets of dense and sparse regions of projections are joined such that the most dense regions of one substrate 31 mates with the most sparse regions of the other substrate 35. The distribution of projections between the most dense and sparse regions may be set in a similar manner to the aforementioned such that the resulting assembly may have a uniform projection density equal to (dmax+dmin) along the outer circumference.

Nevertheless, the illustrated embodiment wherein a set of dense and sparse regions are present on each substrate is preferred. Alignment operation is very easy and accurate since a pair of substrates can be aligned simply by placing their most dense regions diametrically opposite.

The stud-like projections 71, 72 are preferably located over an outer circumferential band having a radial distance of about 2 to 8 mm on the substrates 31, 35.

With respect to shape, dimensions, number, forming method and other considerations, the stud-like projections 71, 72 may be the same as described for the stud-like projections with reference to FIGS. 1 to 6.

The substrates 31, 35 as mentioned above may be joined together through the stud-like projections 71, 72 on the outer circumferential band and the inner connecting member 51 or 52 in the same manner as shown in FIGS. 1, 2, 3, 4, 10, and 11. Alternatively, they may be joined together through the stud-like projections 71, 72 on the outer circumferential band and the stud-like projections 61, 62 on the inner circumferential band in the same manner as shown in FIGS. 12 to 15.

A further preferred embodiment of the present invention is contemplated wherein each or either of substrates is provided with a plurality of stud-like projections on an outer and/or inner circumferential portion, and each of the projections includes a base and a sharply configured fusible portion extending from the base whereby the outer and/or inner circumferential portions of the substrates are joined via the fusible portions of the projections.

Figure 30:
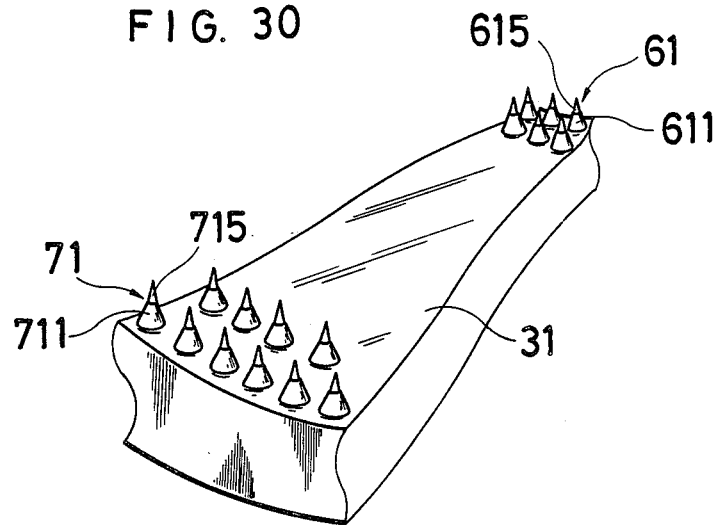
FIG. 30 is an enlarged perspective view of a portion of the substrate used in the disk of the present invention, showing a further example of stud-like projections.

The configuration of such stud-like projections according to the present invention is described by referring to FIG. 30 illustrating one example thereof. In the illustrated embodiment, the substrate 31 is provided on the inner and outer circumferential bands with a plurality of projections 61 and 71. Each projection includes a base 611, 711 of frustoconical shape disposed on the substrate surface and a fusible tip 615, 715 of sharper conical or frustoconical shape extending from the base to define a more acute included angle.

The bases 611, 711 undergo little deformation during the subsequent fusing and thus play the main role of holding the required spacing for the interior space. In contrast, the fusible tips 615, 715 present a sufficiently sharp crest with a reduced diameter to be effectively heated through the application of ultrasonic energy so that they may be readily melted and fused to the adjoining member during ultrasonic sealing.

The shape of the bases 611, 711 and the fusible tips 615, 715 of the projections 61, 71 is not particularly limited insofar as no unnecessary stress is imparted to the projections in releasing the substrate from the mold after its injection molding. The preferred shape of these projections 61, 71 having a base-tip combination is that the base 611, 711 has a frustoconical shape presenting a gentle slope, and the fusible tip 615, 715 has the bottom conforming to the top surface shape of the base and steeply stands on the base away from the substrate.

The crest of the fusible tips 615, 715 may be pointed, curved or plane cut. In addition to the frustoconical baseconical tip combination shown in FIG. 30, there may be employed various combinations including frustopyramidpyramid, semisphere-cone, frustocone-frustocone, and semisphere-frustocone. In contrast, those projections whose base has a flat top surface and whose fusible tip is placed on a central area of the top surface are not preferred because a stress is applied to the fusible tip during molding. This indicates that preferred are those projections in which the base top and the fusible tip bottom are coextensive or the base side surface is contiguously connected to the fusible tip side surface. It is additionally required that the slant of the fusible tip is greater than that of the base.

The side surface of the projections 61, 71 may include a point of inflection between the bases 611, 711 and the fusible tips 615, 715 as illustrated in FIG. 30. Alternatively, the projections 61, 71 may have a smooth transition between the base and the tip, that is, a continuously curved side surface gradually increasing the gradient from the bases 611, 711 to transit to the steep fusible tips 615, 715.

The projections 61, 71 are preferably dimensioned such that the bottom of the bases 611, 711 has a diameter of about 0.5 to about 6 mm, and the top of the bases 611, 711 and the bottom of the fusible tips 615, 715 have a diameter of about 0.1 to about 3 mm. The bases 611, 711 have a height of about 0.3 to about 0.8 mm and the fusible tips 615, 715 have a height of about 0.2 to about 0.5 mm.

The projections 61, 71 may be distributed over the substrate 31 in any desired pattern, for example, in uniform and locally concentrated patterns as shown in FIGS. 18 to 20.

Irrespective of whether the projections 61, 71 are distributed uniformly or locally over the substrate 31, they are located in inner and outer circumferential bands having a radial distance of about 2 to about 8 mm.

Joining of the substrates 31, 35 through such pointed projections may generally be accomplished by ultrasonic sealing. During ultrasonic sealing, the fusible tips 615, 715 are selectively and effectively heated and thus fused while the bases 611, 711 are kept as original. There are obtained advantages including good fusing efficiency, ease of sealing operation, and high bond strength. The interior spacing which is determined by the height of the bases 611, 11 is properly controlled.

Ultrasonic sealing may be applied in combination with adhesive bonding, for example, using hot-melt resinous adhesives. A higher mechanical strength is obtained.

Figure 31:
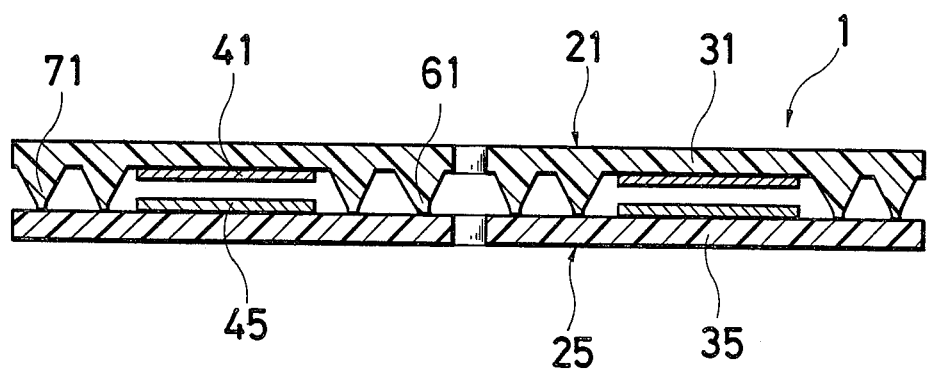
FIGS. 31, 32, and 33 are cross-sectional views of optical recording disks according to different embodiments of the present invention.

A pair of substrates 31, 35 having such pointed projections 61, 71 may be joined in various ways. For example, as shown in FIG. 31, one substrate 31 is provided with a plurality of inner and outer pointed projections 61 and 71 having bases 611, 711 whose height is equal to the predetermined interior spacing. The one substrate 31 is joined with another substrate 35 which is free of projections. The distribution pattern of projections used may be either of the patterns shown in FIGS. 18 to 20.

Figure 32:
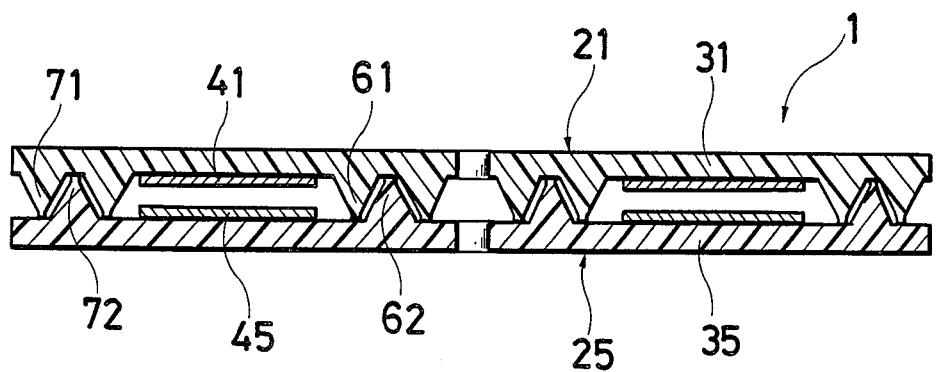

Also, both the substrates 31, 35 may be provided with pointed projections 61, 62 and 71, 72 as shown in FIG. 30 and joined together such that the projections are interdigitated as shown in FIG. 32. Alternatively, a pair of substrates having pointed projections locally distributed as shown in FIG. 19 may be joined by mating the projection distributed regions with the projection-free regions such that the projections 61, 62 and 71, 72 may not overlap or abut.

Figure 33:
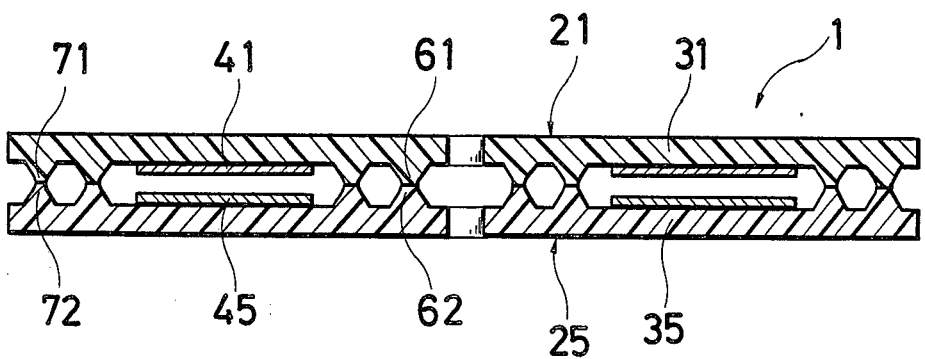

Furthermore, as shown in FIG. 33, a pair of substrates 31 35 provided with pointed projections 61, 62 and 71, 72 having bases whose height is equal to half the interior spacing may be joined together such that the projections are placed in abutment. The fesible tips in abutment are then fused together. The projection distribution pattern used herein may be any desired one of the patterns shown in FIGS. 18 to 20.

The number of pointed projections is about 500 to 3,500 on the inner circumferential band and about 100 to about 2,000 on the outer circumferential band from the standpoint of strength.

A vent may be formed as previously mentioned in order to prevent occurrence of strain in the substrates due to the pressure difference between the interior space and the ambient atmosphere. In general, 2 to 8 vents are formed, preferably in a symmetrical fashion over the disk. The vents are preferably dimensioned such that the height which is generally equal to the interior spacing is about 0.1 to 0.8 mm and the width is about 0.1 to 10 mm. A filter may be disposed in the vents adjacent the pointed projections 71, 72 in order to prevent entry of dust and dirt.

These pointed projections may be formed simultaneous with the substrates during molding or stamping simply by modifying the mold or stamper or platen.

The surface of the substrates 31, 35 on which the recording layers 41, 45 are to be formed is preferably formed with tracking grooves as previously mentioned.

Figure 34:
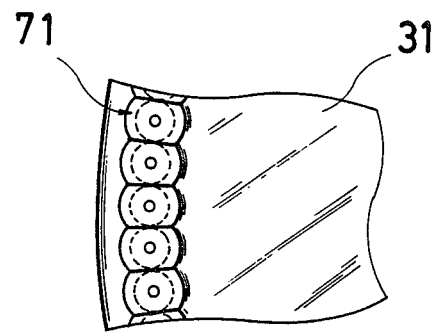
FIGS. 34 and 36 are enlarged plan views of a portion of the substrates used in the disk of the present invention, showing different examples of spike-like projections.
Figure 35:
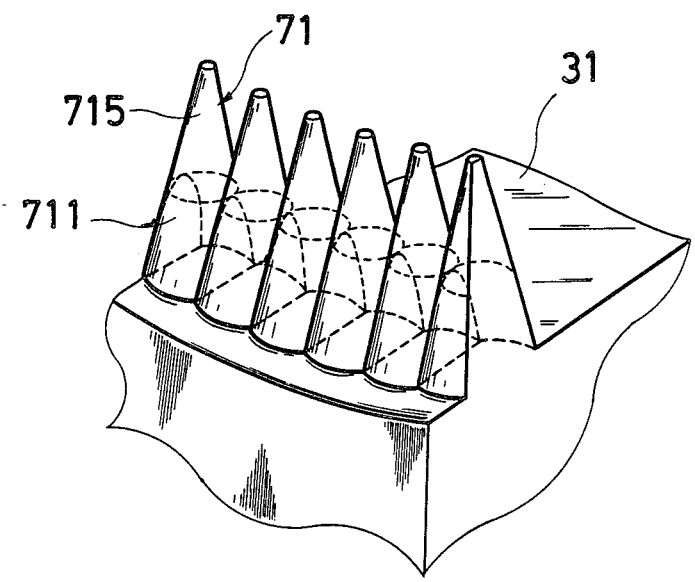
FIGS. 35 and 37 are perspective views of the substrates shown in FIGS. 34 and 36, respectively.

FIGS. 34 and 35 illustrate a further example of the preferred projections used in the practice of the present invention. The illustrated projections 71 are formed by disposing a series of conical projections on an outer circumferential band. The projections are closely positioned such that their bottoms overlap one another Consequently, the frustoconical base portions of the projections are closely juxtaposed to form a circumferentially extending continuous ridge 711. On the ring-like ridge 711 are disposed a series of fusible conical portions 715 with their bottoms positioned in mutual contact in the circumferential direction. As seen from the figures, conical projections are actually cut slightly below their point.

Figure 36:
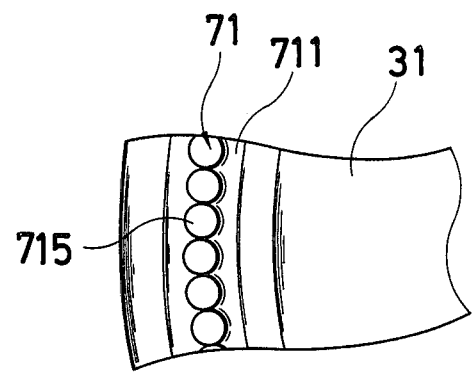
Figure 37:
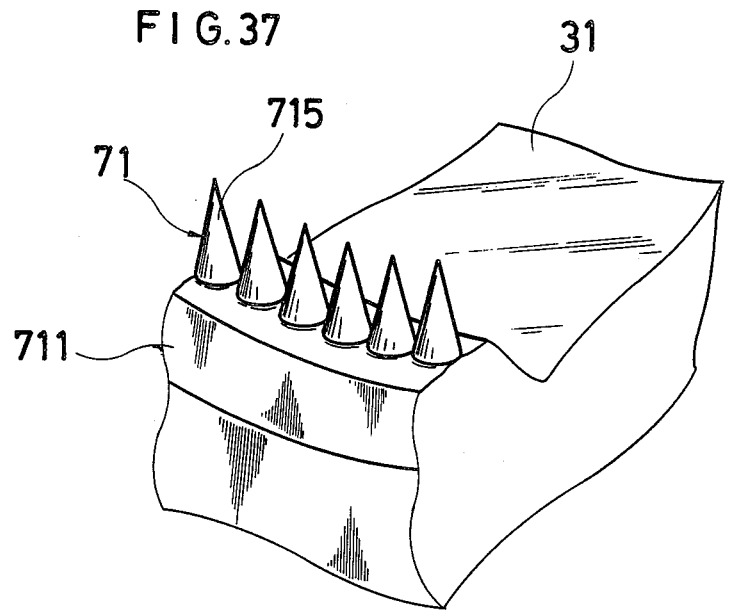

FIGS. 36 and 37 illustrate a still further example of the preferred projections used in the practice of the present invention. The projections 71 are illustrated as comprising a circumferentially extending continuous ridge 711 of a frustum cross section on the substrate 31. A series of fusible cones 715 are circumferentially disposed on the ridge 711 with their bottoms in close contact. Therefore, the preferred projections 71 comprise a circumferentially continuous ridge 711 on the substrate and a series of circumferentially disposed fusible protrusions 715 formed integrally with the ridge.

The ridge 711 is not particularly limited with respect to its cross section as long as it is like a continuous ring. Preferably, the ridge 711 has a greater cross section than each fusible protrusion 715 and functions as a spacer upon fusing as will be described later. If desired, the ridge 711 may be partially cut out to provide a vent.

The shape of fusible protrusions 715 is not particularly limited as long as they are protuberant. They are usually conical as shown in the figures or frustoconical or cylindrical. The fusible protrusions 715 may have their bottom smoothly connected to the ridge 711 as in the example shown in FIGS. 34 and 35. But smooth connection is not particularly required. The fusible protrusions 715 may have a bottom diameter smaller than the radial distance of the ridge top so that they occupy part of the ridge top surface as shown in FIGS. 36 and 37.

A plurality of fusible protrusions 715 may be disposed on the ridge 711 by a variety of methods. In general, they may be arranged in a circumferential row as shown in the figures. They are placed in close contact at their bottom to ensure fuse bonding. If desired, the fusible protrusions 715 may be disposed in two or more rows or spaced apart. Alternatively, they may be distributed such that their distribution density may regularly or randomly vary in the circumferential direction.

The substrates may be joined together via such projections 71 by fusing, particularly ultrasonic sealing as previously mentioned. During the fusing process, the fusible protrusions 715 are efficiently heated and thus melted, forming a fused bond. On the contrary, the ridge 711 located below the fusible protrusions 715 and having a greater cross section undergoes little deformation during the fusing process and thus plays the role of a spacer. Thus, the ridge 711 should have a height approximately equal to the interior spacing of the air sandwich structure. In general, the ridge height ranges from about 0.2 to 0.5 mm. The ridge 711 has a radial distance of about 1 to about 5 mm. The fusible protrusions 715 each ordinarily have a height of about 0.1 to 0.3 mm and a bottom diameter of about 0.1 to 0.3 mm.

Figure 38:
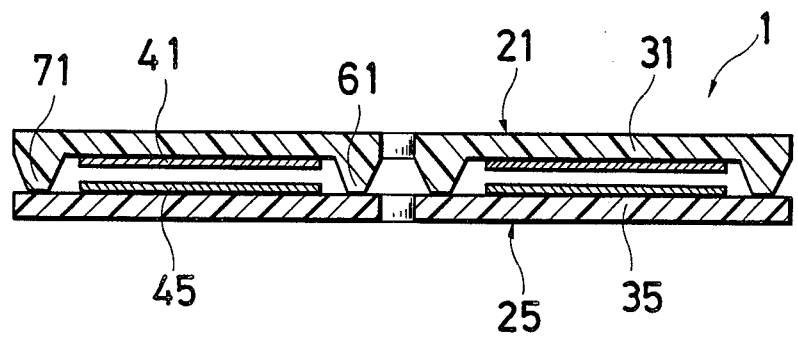
FIGS. 38, 39 and 40 are cross-sectional views of optical recording disks according to different embodiments of the present invention.
Figure 39:
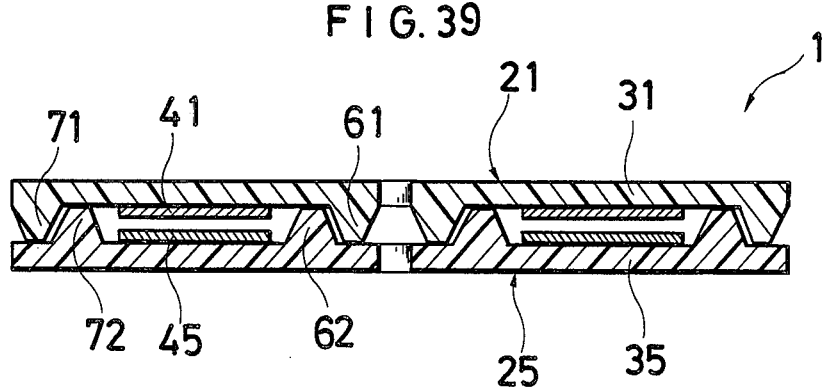
Figure 40:
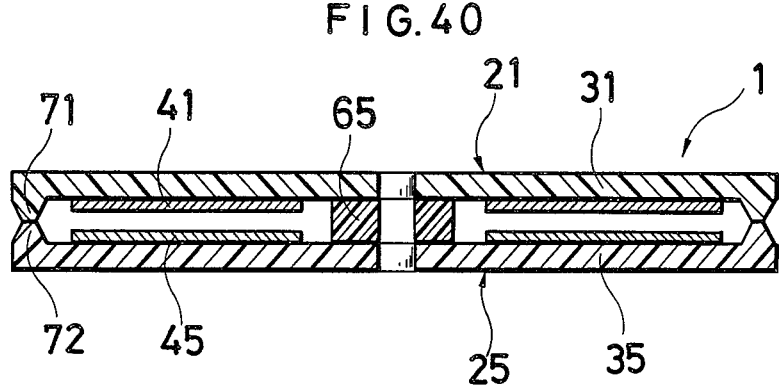

The substrates 31, 35 having such projections 71 may be joined together by ultrasonic sealing to heat and melt the fusible protrusions 715 while the ridge 711 are kept unchanged as shown in FIGS. 38 to 40. Such efficient fusing facilitates operation and provides an increased bond strength. The interior spacing can be precisely controlled because it is determined by the height of the ridge 711. The ultrasonic sealing may be combined with adhesive bonding using such an adhesive as a hot-melt resinous adhesive. Then the mechanical strength is further improved.

The projections may be formed on the outer and/or inner circumferential portion of at least one of the substrates. In FIG. 38, the projections 61, 71 are formed on the outer and inner circumferential portions of one substrate 31. In FIG. 39, the projections 61, 62, 71, 72 are formed on the outer and inner circumferential portions of both the substrates 31, 35. The projections 61 and 71 on one substrate 31 come in mesh with the projections 62 and 72 on the other substrate 35, respectively, upon joining. In FIG. 40, both the substrates 31, 35 are provided on the outer circumferential band with projections 71, 72 in a mirror image relationship.

The substrates 31, 35 having such projections may be joined together in various designs. One example is shown in FIG. 38 wherein one substrate 31 is provided with projections 61, 71 having a ridge whose height is equal to the interior spacing. This substrate 31 is joined to a projection-free substrate 35. In another example shown in FIG. 39, both substrates 31, 35 are provided with projections 61, 62, 71, 72 having a ridge whose height is equal to the interior spacing. In FIG. 40, both substrates 31, 35 are provided with projections 71, 72 having a ridge whose height is equal to half the interior spacing. The substrates are joined together by placing the projections 71, 72 in abutment and fusing their fusible cones.

When a vent is formed as mentioned above, a filter may be disposed nearby to prevent entry of dirt and dust.

Such projections may be formed integral with substrates at the same time as substrate molding by slightly modifying a mold or stamper or platen.

Figure 41:
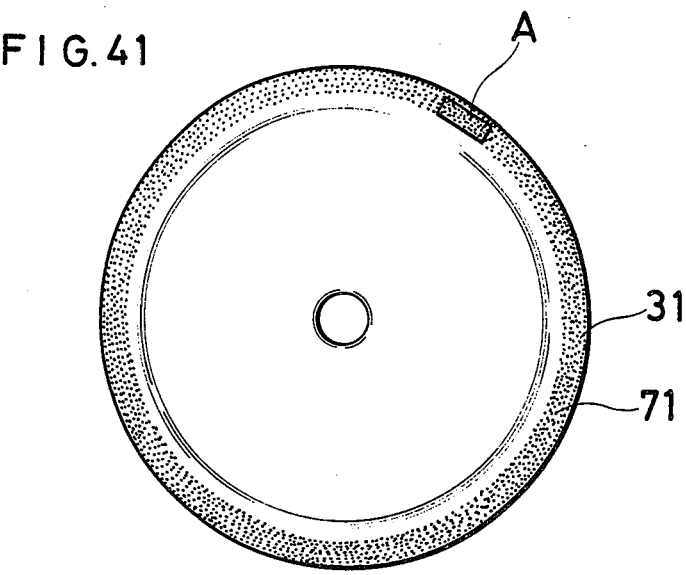
FIG. 41 is a plan view of the substrate according to a further embodiment of the present invention.
Figure 42:
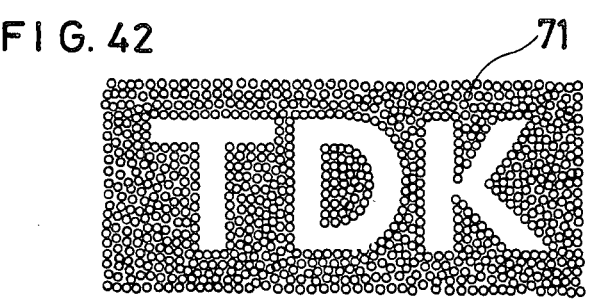
FIGS. 42 and 43 are segmental enlarged views of different examples of the region designated at A in FIG. 41.
Figure 43:
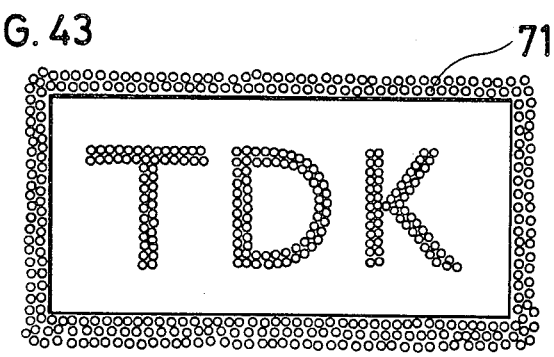

A further preferred embodiment of the disk of the present invention is shown in FIGS. 41 to 43. In these embodiments, projections are distributed on the outer circumferential band such that the projections are absent in certain local regions which resemble some suitable characters or letters and thus provide an identification mark. The term identification mark used herein means that it has the function of representing a trade mark or name or grade, and it is generally a character, figure, symbol or combination thereof.

That region A where the projections are absent may be located at any position along the outer circumferential band where numerous projections are formed, as understood from FIG. 41. No particular limit is imposed on the contour and number of identification marks provided by the projection-free regions.

FIGS. 42 and 43 illustrate positive and negative embodiments wherein projection-free regions provide or define an identification mark. More specifically, in the embodiment shown in FIG. 42, three projection-free regions resembling T, D, and K are defined to provide an identification mark TDK. No particular limit is imposed on the projection-free regions with respect to size and shape as long as they are located within the range where the projections are distributed.

In the embodiment shown in FIG. 43, those projections present in a region defining and encompassing those projections representative of characters TDK are removed. The projections remaining within the region provides the identification mark. The contour of the projection-free region is rectangular in the illustrated example, but not particularly limited.

Display of an identification mark by the use of selectively distributed projections is not limited to these illustrated embodiments and can be accomplished in various ways. It suffices that the display of such an identification mark should clearly appear in the finished optical recording disks. It is thus advantageous upon manufacture to provide only one substrate with a plurality of projections 71 while removing selected projections to define a projection-free region representative of an identification mark in the projection band.

The projection-free regions may be located on the outer and/or inner circumferential band of the substrates so that the associated identification marks appear on the outer and/or inner circumferential band.

Recording Layer

The recording layer used in the disk of the present invention may preferably be formed of dyes alone or dye compositions.

Depending on the particular wavelength of writing and reading light beams used, the dyes may be selected from those dyes capable of efficient adsorption of the writing and reading light beams. The preferred light source emits a semiconductor laser beam because a size reduction of the associated apparatus can be expected. Thus the preferred dyes include cyanine dyes, phthalocyanine dyes, anthraquinone dyes, azo dyes, triphenylmethane dyes, pyrylium dyes, and thiapyrylium salt dyes.

The dye compositions from which the recording layers are formed may contain dyes as mentioned above and self-oxidizing resins such as nitrocellulose and thermoplastic resins such as polystyrene and nylon. Quenchers may be contained in order to prevent oxidative deterioration of the dyes. Any other additives may also be used for their usual purposes.

The most preferred combinations include mixtures of cyanine dyes of indolenine series and quenchers such as bisphenyldithiols. It is also preferred to use them in an ionic bond form consisting of a dye cation bonded with a quencher anion.

The recording layers may be formed by applying a solution of the dye or dye composition in a suitable solvent such as ketones, esters, ethers, aromatics, haloalkyls, alcohols, etc. by any suitable techniques such as spinner coating. The recording layers may preferably have a thickness of about 0.01 to about 10 μm. In coating the recording layers, the solution may be prepared to a viscosity of about 0.5 to 10 centipoise and the spinner is rotated at about 500 to 1000 rpm.

When grooves for tracking control are formed, the resulting recording tracks in the recording layer may preferably have a thickness of about 0.2 μm or less, more preferably from about 0.05 μm to about 0.15 μm.

Writing sensitivity is increased when these requirements are met. Multiple reflection within the recording layer provides a substantially increased reflectivity, resulting in a substantial improvement in S/N ratio upon reading. A difference in thickness between the recording track and the remainder affords a greater difference in reflectivity to facilitate tracking control.

The optical recording section may further include topcoat and undercoat layers in addition to the recording layer.

Although the foregoing embodiments are concerned with the double side recording type, the present invention is equally applicable to disks of the single side recording type wherein a recording layer is formed on only one of the substrates. In the latter case, the other substrate may be opaque.

Writing of the optical recording disk of the present invention may be carried out by directing a writing light beam from the rear or outer side of the substrate associated with the intended recording layer while rotating the disk. A series of pits are then formed in a recording track preferably located in a grooved channel. The thus formed pits can be read out by directing a reading light beam from the rear side of the substrate and detecting the reflected light while rotating the disk.

Tracking control may generally be carried out by dividing the reflected light during writing and reading operations and introducing the divided beams to a pair of sensors. When a beam spot is somewhat deviated from the recording track, a step of the tracking groove causes the quantities of primary light received by the sensors to be unbalanced by the interference due to phase difference. Detection of signals from the sensors gives a tracking error signal.

When the recording layer is formed from a composition comprising a thermoplastic resin and a dye, the once formed pits may be erased by the use of light or heat so that the layer is rewritable.

The light sources which can be used in writing and reading include a variety of laser beams with semiconductor laser being most preferred.

BENEFITS OF THE INVENTION

According to the present invention, by joining a pair of substrates through integral projections by adhesive bonding or fusing without any misalignment between the substrates or any deviation of a spacer, there are obtained disks which exhibit improved dynamic balance during rotation.

The disks have an increased strength at the center and the periphery and thus an extended lifetime.

Since the disks of the present invention are easy to manufacture, increased precision, mass production, and cost reduction are expectable.

Since the substrates are integrally formed with a plurality of projections along the outer and/or inner circumferential bands, the disks of the present invention are assembled with less parts and thus at lower cost.

The disks of the present invention can be fabricated without adversely affecting the formation of the recording layer by coating.

The stud-like projections are readily fused by ultrasonic sealing to achieve a high bond strength, offering an additional advantage in the fabrication of the disks.

When adhesive is applied, it can be uniformly introduced throughout projections to achieve a high bond strength and a good finish.

The recording layer undergoes no damage during ultrasonic sealing and adhesive bonding.

A vent is readily formed in the outer circumferential band of the substrate in various ways. The vent communicates the interior space with the exterior to make the pressure in the interior space equal to the ambient pressure to prevent any deformation of the substrates by strain, thus ensuring satisfactory recording and reproducing performance.

When a plurality of stud-like projections are distributed along the outer circumferential band of substrates with a varying distribution pattern, not only the number of parts to assemble a disk is reduced, but also a pair of substrates can be readily and accurately assembled and joined such that the resulting disk exhibits a good dynamic balance during service. A further cost reduction is obtained because of significantly increased productivity.

When each of the projections used to join substrates includes a base having a gentle slope extending from the substrate and a pointed fusible tip having a steep slope extending from the base, there occurs little damage to the projections by stress during formation of the substrates. The substrates are formed in increased yields. The substrates are joined by fusing the fusible tips while the projection bases determine the interior spacing. There are obtained several advantages of assembling precision, mass production, and cost reduction. Another advantage in fabrication is that the fusible tips may be fused by a ultrasonic sealing technique to achieve a firm bond. No damage is introduced in the recording layers.

When the projections comprise a plurality of fusible protrusions standing on a continuous ridge on the substrate, little damage is caused to substrates by any stress applied through protrusions during formation of the substrates. Then the substrates can be produced with high yields. A pair of substrates are joined by melting down the fusible protrusions on the ridge for bonding so that the interior spacing is determined by the ridge. This ensures assembly precision, mass production, and cost reduction.

Bonding the fusible tips of the projections by ultrasonic sealing leads to advantages in bond strength and fabrication without adversely affecting the recording layer.

An identification mark can be readily provided in substantially the same manufacturing process as in the prior art. The identificatin marks do not fade away as printed marks do and no staining results.

We claim:

1. In an optical recording disk comprising a pair of disk-shaped substrates each having a central opening and a recording layer formed on at least one of said substrates wherein said substrates are joined at outer and inner circumferential portions to define an interior space therebetween such that the recording layer is enclosed in the space, the improvement comprising a plurality of projections, each having a non-elongate section and formed on the outer and/or inner circumferential portions of at least one of said substrates, whereby the outer and/or inner circumferential portions of the substrates are joined through said projections, wherein the projections are formed on a circumferentially extending continuous ridge on the substrate.

2. An optical recording disk according to claim 1 wherein a plurality of stud-like projections are formed on the outer circumferential portion of at least one of said substrates whereby the outer circumferential portions of said substrates are joined through said projections, and the inner circumferential portions of said substrates are joined through an inner connecting member.

3. An optical recording disk according to claim 2 wherein said inner connecting member is an annular member having opposed major plane surfaces to which those surfaces of the inner circumferential portions of the substrates facing the interior space are secured.

4. An optical recording disk according to claim 3 wherein said inner connecting member comprises an annular body having a ring-shape rib formed on a central portion of the circumference of the body whereby the remaining portions of the circumference of the body are in contact with the inner side surfaces of the substrates defining the openings and the axially opposed plane surfaces of the rib are in contact with the recording layer-bearing surfaces of the substrates adjacent the openings.

5. An optical recording disk according to claim 2 wherein said inner connecting member comprises a projection formed on the inner circumferential portion of at least one of the substrates.

6. An optical recording disk according to claim 2 wherein said inner connecting member is formed of an adhesive whereby the inner circumferential portions of the substrates are joined to define the interior space between the substrates.

7. An optical recording disk according to claim 2 wherein a gap among the projections is filled with an adhesive to provide an air-tight seal between the interior space and the exterior.

8. An optical recording disk according to claim 2 wherein the interior space is in communication with the exterior through a gap among the stud-like projections.

9. An optical recording disk according to claim 1 wherein a plurality of stud-like projections are formed on the inner circumferential portion of at least one of said substrates whereby the inner circumferential portions of said substrates are joined through said projections, and the outer circumferential portions of said substrates are joined through an outer connecting member.

10. An optical recording disk according to claim 9 wherein said outer connecting member is an annular member having opposed major plane surfaces to which those surfaces of the outer circumferential portions of the substrates facing the interior space are secured.

11. An optical recording disk according to claim 9 wherein said outer connecting member comprises a projection formed on the outer circumferential portion of at least one of the substrates.

12. An optical recording disk according to claim 11 wherein said projection is a ring-shaped rim.

13. An optical recording disk according to claim 9 wherein the outer circumferential portions of the substrates are sealed to the outer connecting member to provide an air-tight seal between the interior space and the exterior.

14. An optical recording disk according to claim 9 wherein the joint between the outer circumferential portions is provided with a vent through which the interior space communicates with the exterior.

15. An optical recording disk according to claim 1 wherein a plurality of stud-like projections are formed on the outer and inner circumferential portions of at least one of said substrates whereby the outer and inner circumferential portions of said substrates are joined through said projections.

16. An optical recording disk according to claim 15 wherein a gap among the projections on the outer circumferential portions is filled with an adhesive to provide an air-tight seal between the interior space and the exterior.

17. An optical disk according to claim 15 wherein the interior space is in communication with the exterior through gaps among the stud-like projections.

18. An optical recording disk according to claim 1 wherein the projections are formed on one of the substrates.

19. An optical recording disk according to claim 1 wherein the projections are formed in radially spaced rows on both the substrates and are interdigitated.

20. An optical recording disk according to claim 1 wherein each said projection is of cone or pyramid shape.

21. An optical recording disk according to claim 1 wherein writing and reading operations are carried out from the rear surface of the substrate remote from the recording layer.

22. An optical recording disk according to claim 1 wherein each said projection is of cylinder or prism shape.

23. An optical recording disk according to claim 1 wherein the recording layer has no reflective layer placed thereon.

24. An optical recording disk according to claim 1 wherein the joining of the substrates through the projections is by ultrasonic sealing.

25. An optical recording disk according to claim 1 wherein the joining of the substrates through the projections is by filling an adhesive among the projections.

26. An optical recording disk according to claim 1 wherein the plurality of stud-like projections are distributed on the outer circumferential portions of both the substrates such that the distribution density locally varies, and the outer circumferential portions of the substrates are joined together through the projections by mating a portion of one substrate having the maximum projection distribution with a portion of the other substrate having the minimum projection distribution to thereby provide a substantially uniform distribution of overall projections throughout the joined substrates in a circumferential direction.

27. An optical recording disk according to claim 1 wherein said plurality of projections are distributed on the outer and/or inner circumferential portions of at least one of said substrates such that the projections are absent in a certain local region which provides an identification mark.

28. An optical recording disk according to claim 1 wherein the recording layer comprises a dye alone or a dye composition.

29. An optical recording disk according to claim 1 wherein the recording layer is formed on one of the substrates.

30. An optical recording disk according to claim 1 wherein the recording layer is formed on each of the substrates.

31. An optical recording disk according to claim 1 wherein the substrate having the recording layer formed thereon is substantially transparent to writing and reading light.

32. An optical recording disk according to claim 1 wherein the substrates are formed of resin.

33. An optical recording disk according to claim 31 wherein the resin is an acrylic resin or polycarbonate resin.

34. In an optical recording disk comprising a pair of disk shaped substrates each having a central opening and a recording layer formed on at least one of said substrates wherein said substrates are joined at outer and inner circumferential portions to define an interior space therebetween such that the recording layer is enclosed in the space, the improvement comprising a plurality of projections, each having a non-elongate section and formed on the outer and/or inner circumferential portions of at least one of said substrates, whereby the outer and/or inner circumferential portions of the substrates are joined through said projections, each projection including a base and a sharply configured fusible portion extending from the base whereby the outer and/or inner circumferential portions of the substrates are joined via the fusible portions of said projections.

35. An optical recording disk according to claim 34 wherein overlapping portions of said bases form a continous ridge.

36. An optical recording disk according to claim 1 wherein the bottoms of said projections are in close contact.

* * * * *